(12) United States Patent
Whittle et al.

(10) Patent No.: US 7,395,500 B2
(45) Date of Patent: Jul. 1, 2008

(54) SPACE-OPTIMIZING CONTENT DISPLAY

(75) Inventors: Derrick Wang Whittle, Marietta, GA (US); Edward F. Seitz, Atlanta, GA (US)

(73) Assignee: Yahoo! Inc., Sunnyvale, CA (US)

( * ) Notice: Subject to any disclaimer, the term of this patent is extended or adjusted under 35 U.S.C. 154(b) by 213 days.

(21) Appl. No.: 10/651,476

(22) Filed: Aug. 29, 2003

(65) Prior Publication Data

US 2005/0050462 A1  Mar. 3, 2005

(51) Int. Cl.
G06F 17/00 (2006.01)
G06F 17/20 (2006.01)
G06F 3/048 (2006.01)

(52) U.S. Cl. .................. 715/243; 715/234; 715/244; 715/245; 715/711; 715/784; 715/785; 715/786; 715/787

(58) Field of Classification Search ............... 715/513, 715/517, 234, 243–245, 711, 784–787
See application file for complete search history.

(56) References Cited

U.S. PATENT DOCUMENTS

| 4,663,615 | A | * | 5/1987 | Hernandez et al. | 715/785 |
|---|---|---|---|---|---|
| 5,544,288 | A | * | 8/1996 | Morgan et al. | 715/801 |
| 5,546,521 | A | * | 8/1996 | Martinez | 715/711 |
| 5,621,871 | A | * | 4/1997 | Jaremko et al. | 715/512 |
| 5,655,094 | A | * | 8/1997 | Cline et al. | 715/786 |
| 5,734,835 | A | | 3/1998 | Selker | |
| 5,754,755 | A | | 5/1998 | Smith | |
| 5,801,703 | A | * | 9/1998 | Bowden et al. | 715/841 |
| 5,805,884 | A | | 9/1998 | Sitbon et al. | |
| 5,878,213 | A | | 3/1999 | Bittinger et al. | |
| 5,897,644 | A | * | 4/1999 | Nielsen | 715/513 |
| 5,933,140 | A | * | 8/1999 | Strahorn et al. | 715/712 |
| 6,078,935 | A | * | 6/2000 | Nielsen | 715/513 |
| 6,175,563 | B1 | | 1/2001 | Miloslavsky | |
| 6,216,141 | B1 | * | 4/2001 | Straub et al. | 715/513 |
| 6,230,170 | B1 | * | 5/2001 | Zellweger et al. | 715/512 |
| 6,259,445 | B1 | * | 7/2001 | Hennum et al. | 715/709 |
| 6,263,369 | B1 | | 7/2001 | Sitaraman et al. | |
| 6,272,485 | B1 | | 8/2001 | Sragner | |
| 6,300,947 | B1 | * | 10/2001 | Kanevsky | 715/866 |
| 6,327,608 | B1 | | 12/2001 | Dillingham | |

(Continued)

OTHER PUBLICATIONS

Horton, Ivor, Beginning Java 2, Wrox Press Ltd., Birmingham, UK, Aug. 2000, pp. 602-617 [ISBN 1-861002-23-8].*

(Continued)

*Primary Examiner*—John Breene
*Assistant Examiner*—Robert Stevens
(74) *Attorney, Agent, or Firm*—Morrison & Foerster LLP

(57) ABSTRACT

An apparatus, method, computer system, and computer program product to optimize space available for displaying text descriptions in a limited area, such as a sidebar. Space is optimized by displaying only the maximum portion of the text describing each selection that will fit within the limited area, thereby allowing space to display additional text descriptions in the remaining portion of the limited area. Positioning a pointer over the maximum portion of the text causes the complete portion of the text to be displayed. The complete portion of the text can serve as a link to content related to the text. Space is also optimized by providing a thin scroll bar to add space for displaying content within a window.

44 Claims, 24 Drawing Sheets

U.S. PATENT DOCUMENTS

| | | | | |
|---|---|---|---|---|
| 6,405,221 | B1* | 6/2002 | Levine et al. | 715/501.1 |
| 6,563,514 | B1* | 5/2003 | Samar | 715/711 |
| 6,570,594 | B1* | 5/2003 | Wagner | 715/786 |
| 6,584,479 | B2* | 6/2003 | Chang et al. | 715/512 |
| 6,636,856 | B2* | 10/2003 | Pasquali | 707/10 |
| 6,658,419 | B2* | 12/2003 | Pasquali | 707/10 |
| 6,684,385 | B1* | 1/2004 | Bailey et al. | 717/109 |
| 6,701,513 | B1* | 3/2004 | Bailey | 717/109 |
| 6,744,867 | B1 | 6/2004 | Chin et al. | |
| 6,748,418 | B1 | 6/2004 | Yoshida et al. | |
| 6,750,884 | B1* | 6/2004 | Steigerwald et al. | 715/771 |
| 6,792,436 | B1 | 9/2004 | Zhu | |
| 6,792,459 | B2 | 9/2004 | Elnozahy et al. | |
| 6,816,944 | B2 | 11/2004 | Peng | |
| 6,828,988 | B2* | 12/2004 | Hudson et al. | 715/711 |
| 6,868,292 | B2 | 3/2005 | Fico et al. | |
| 6,944,660 | B2 | 9/2005 | Eshghi | |
| 6,961,929 | B1 | 11/2005 | Pelegri-Llopart et al. | |
| 7,051,119 | B2 | 5/2006 | Shafron et al. | |
| 7,107,530 | B2* | 9/2006 | Blakely et al. | 715/711 |
| 7,231,644 | B2 | 6/2007 | Kieffer | |
| 7,325,204 | B2* | 1/2008 | Rogers | 715/792 |
| 2001/0056448 | A1* | 12/2001 | Takeda | 707/515 |
| 2002/0042819 | A1* | 4/2002 | Reichert et al. | 709/217 |
| 2002/0116407 | A1 | 8/2002 | Negishi et al. | |
| 2002/0178007 | A1* | 11/2002 | Slotznick et al. | 704/270.1 |
| 2003/0058281 | A1* | 3/2003 | Kepros et al. | 345/786 |
| 2003/0145310 | A1* | 7/2003 | Thames et al. | 717/123 |
| 2003/0222924 | A1* | 12/2003 | Baron | 345/850 |
| 2004/0004632 | A1* | 1/2004 | Knight et al. | 345/711 |
| 2004/0036714 | A1* | 2/2004 | Blakely et al. | 345/711 |
| 2004/0212640 | A1* | 10/2004 | Mann et al. | 345/792 |
| 2004/0268232 | A1* | 12/2004 | Tunning | 715/513 |
| 2005/0028107 | A1* | 2/2005 | Gomes et al. | 715/762 |
| 2005/0060664 | A1* | 3/2005 | Rogers | 715/810 |
| 2007/0022155 | A1 | 1/2007 | Owens et al. | |

OTHER PUBLICATIONS

Chang, Bei-Wei, et al., "A Negotiation Architecture for Fluid Documents", UIST '98, San Francisco, CA, © 1998, pp. 123-132.*

MacLean, Allan, et al., "Design Rationale: The Argument Behind the Artifact", CHI '89 Proceedings, May 1989, pp. 247-252.*

Zellweger, Polle T., et al., "The Impact of Fluid Documents on Reading and Browsing: An Observational Study", CHI 2000, The Hague, Amsterdam, © 2000, pp. 249-256.*

Zellweger et al., "Fluid Links for Informed and Incremental Link Transitions", HyperText '98, Pittsburgh, PA, May 1998, pp. 50-57.*

Cadiz, JJ, et al., "Designing and Deploying an Information Awareness Interface", CSCW '02, New Orleans, LA, Nov. 16-20, 2002, pp. 314-323.*

Witt, Rebecca J., et al., "Reducing Cognitive Overhead on the World Wide Web", ACSC 2002, Melbourne, Australia, © 2001, pp. 311-320.*

Losavio, Marco, "Correctly Set Scrollbars' Width and Height", DevX.com Tip of the Day, Jun. 5, 1999, pp. 1-3 (downloaded from: www.devx.com/vb2themax/Tip/18285).*

Michael Edward and Scott Roberts, *Microsoft Corporation*, "Reusing Internet Explorer and the WebBrowser Control: An Array of Options," http://msdn.microsoft.com/library/en-us/dnwebgen/html/, Jul. 30, 1998, pp. 1-7 (printed Aug. 25, 2003).

Microsoft Corporation (Oct. 1998). "Microsoft Office. Microsoft Outlook 2000. Product Enhancements Guide," pp. 1-61.

Kaasinen, E. et al. (2000). "Two Approaches to Bringing Internet Services to WAP Devices," *Computer Networks* 33:231-246.

* cited by examiner

User Interface

Sidebar Menu

Sidebar Detail

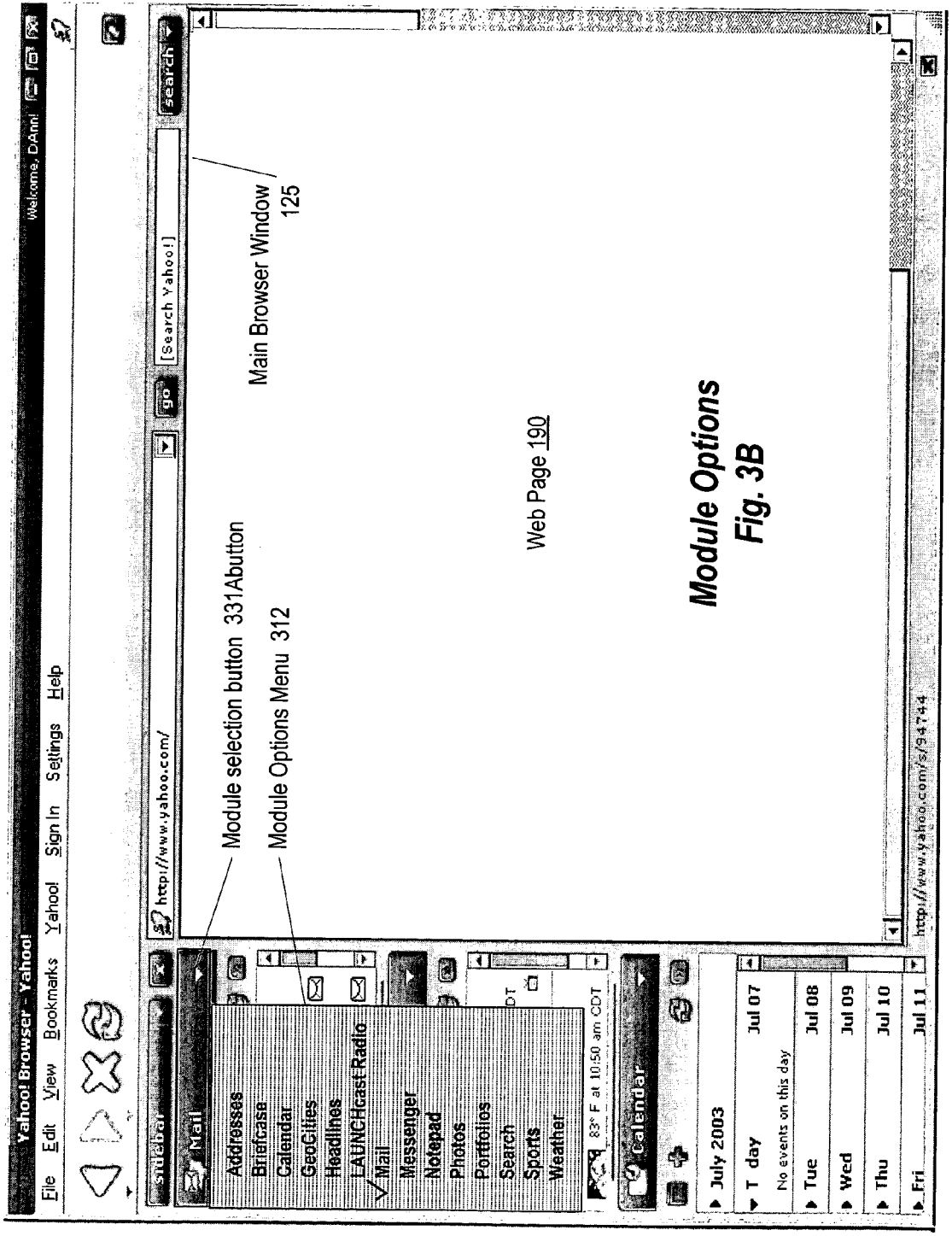
Fig. 3B  Module Options

*Mail Toolbar Detail*

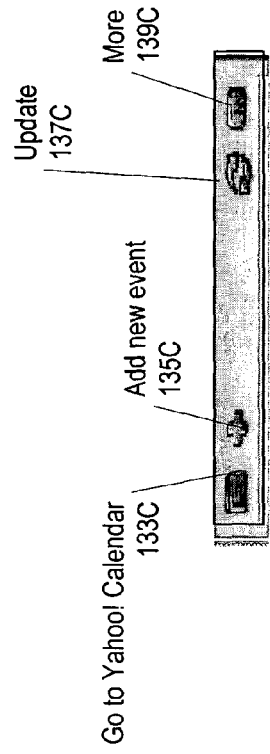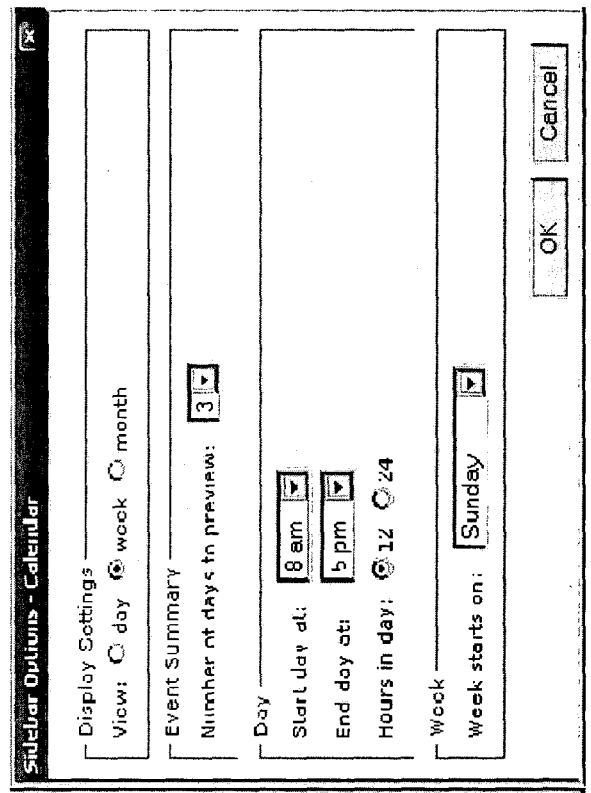
*Calendar Toolbar Detail*
*Fig. 3D*

*Complete Content Item Description*

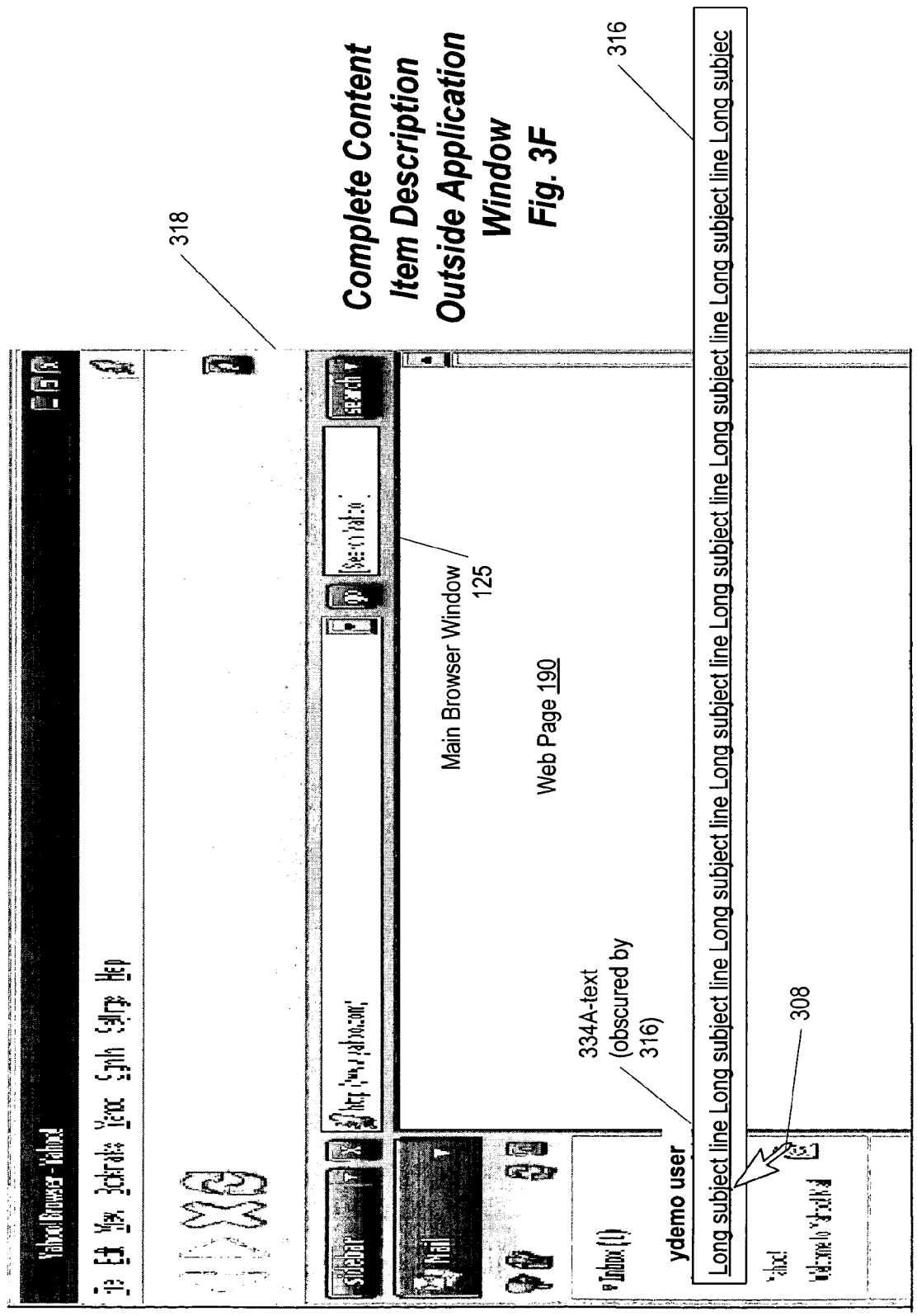

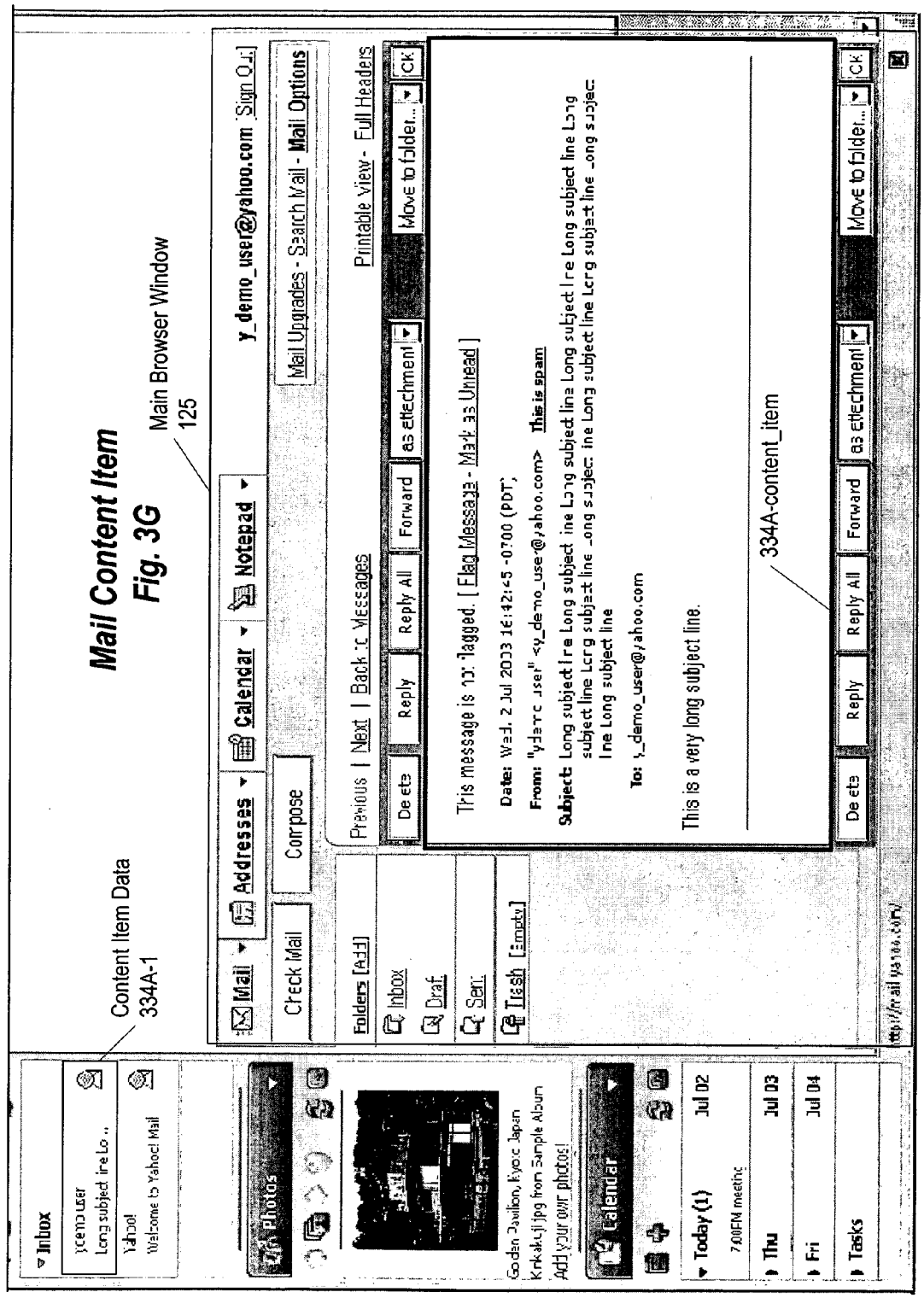

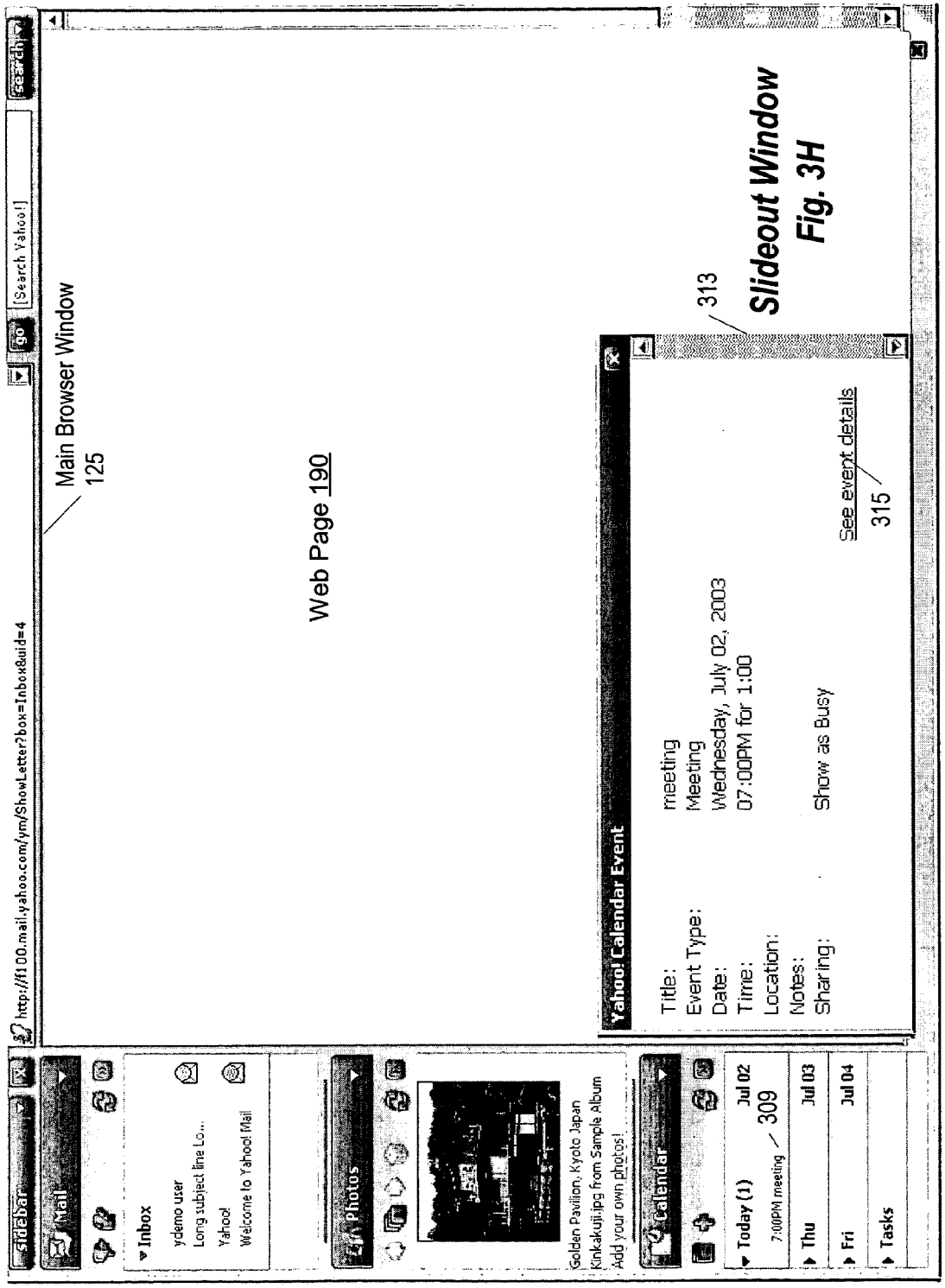

Event Details

*Thin Scroll Bar*

*New Browser Window*

Example Software Architecture

Component Instances Interaction

*Data Flow in Example Software Architecture*

Fig. 7 — Prepare to Display Sidebar

Sidebar Interfaces

Alternative Software Architecture

Interaction between Alternative Components

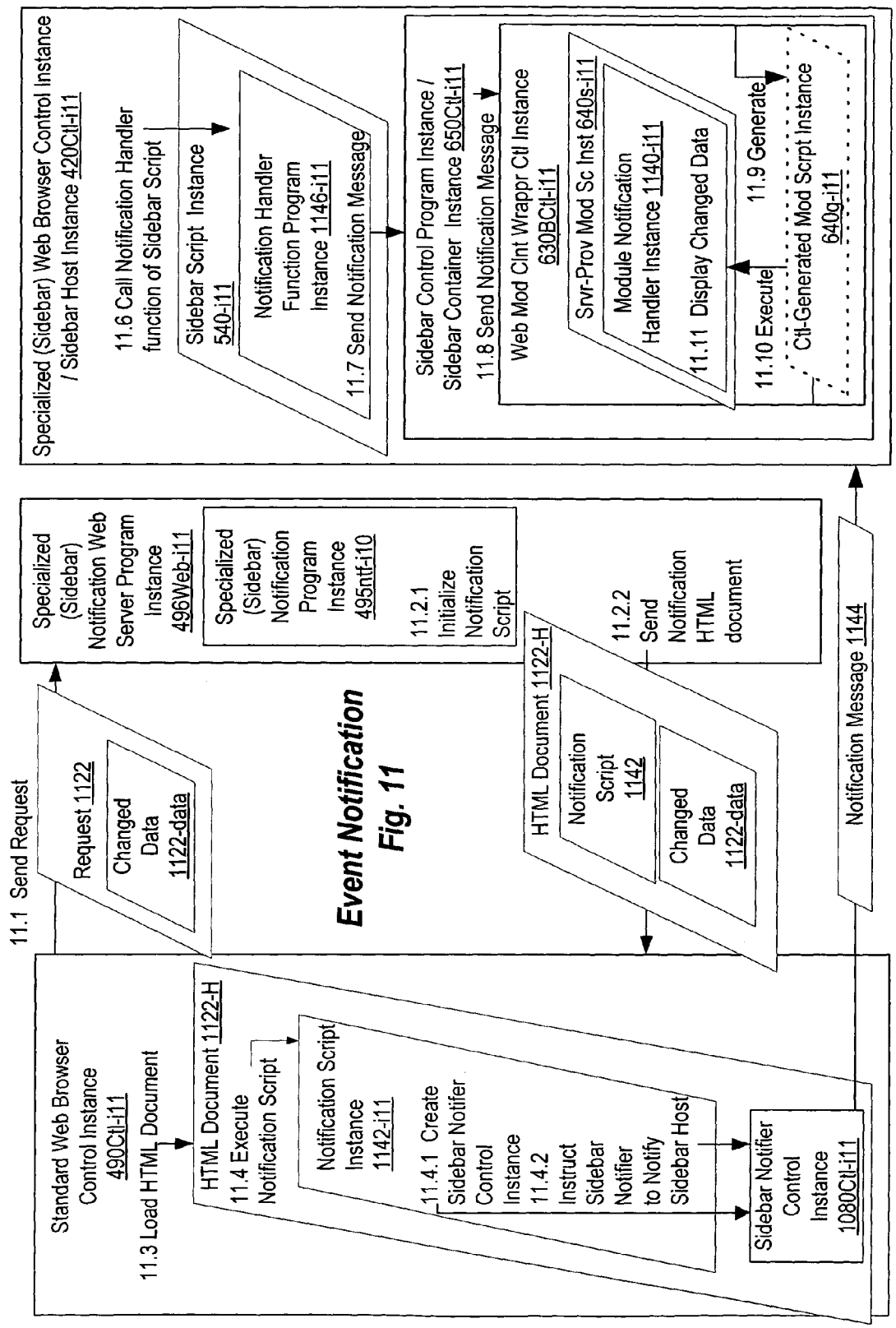

SPACE-OPTIMIZING CONTENT DISPLAY

BACKGROUND OF THE INVENTION

1. Field of the Invention

The present invention relates to increasing the amount of information that can be displayed within a limited area of a user interface, such as a sidebar.

2. Description of the Related Art

The number of people using computer systems in their daily lives has increased dramatically with the growth of the Internet and the World Wide Web, which provide access to virtually unlimited information stored by computer systems all over the world. As the sophistication of computer users increases, user expectations of the types of user interfaces and functionality that should be provided by software applications also increase.

Many software development environments for desktop and network applications enable a developer to assemble an application using two or more components that provide different types of functionality to the application. Components provide the capability for an application to provide rich, fully-featured user interfaces, including functionality for windows, buttons, scrollbars, and so on. A component can be re-used by many applications within a computer or among computers in a network. The application provides an environment, also referred to as a context, in which the component runs. Examples of applications built from components are word processors, such as Microsoft Word, and database programs, such as Microsoft Access.

A component can include display code and functional code, where the display code can display a visual portion of a user interface and the functional code controls when the visual portion is displayed and other functions, such as responding to a user action taken with reference to the visual portion. For example, a component's display code can display a button in a user interface, and the component's functional code can determine when the button is to be displayed and specify a function to perform when a user performs an action with reference to the button. For example, the user can point a cursor to the button (using a mouse or other pointing device) and click on the button, which causes the functional code for responding to activation of the button to be performed. A component is not, however, required to include display code or to display a visual portion of the user interface. When a component does not display a visual portion of the user interface, the component is sometimes referred to as being invisible.

Unfortunately, the functionality to implement components is not easily achieved using the technology used for the web. Web browsers provide information in the form of a web page, which is produced by interpreting a text document encoded using a language specially developed for web applications, Hypertext Markup Language (HTML). A single HTML document cannot easily provide all of the information needed to provide a sophisticated user interface in the form of a web page. Because of the limitations of HTML, web application developers face significant challenges in providing user interfaces that can access the wealth of information available via the Internet using web technology and yet provide the sophisticated features meeting users' expectations.

For example, a common format for user interfaces is to display descriptions of content items available in a multi-window format, with different types of content items grouped into different windows. Such a multi-window format enables a user to view many types of content simultaneously. Typically, a main window, also referred to as a primary window, serves as the user's primary interface to interact with an application displaying the data. A given window, such as the main window, can open other windows, also referred to as secondary windows, to provide the user with the capability to interact with particular types of application-specific data.

When an application needs input from a user, the application provides a window into which the user enters or provides the information. For example, a typical Open menu item requires the name of a file to open, and the application provides a secondary window into which the user can type the name of the file. Secondary windows to receive information from a user can be implemented using many types of components; for example, a dialog box component is often used to open a new window in response to input from the user (here, clicking on the Open menu item). In the dialog box, the user types the name of the file. Another example of a component that opens a new window to receive information from a user is a listbox component, which can provide a list of existing files from which to choose and the ability to create a new file. Similarly, a tree component provides a list of folders from which an existing file can be selected and/or a new file or folder named. Another example of a component that opens a new window to receive additional information from a user is a checkbox component. A checkbox component provides a labeled box with a list of pre-determined options, wherein each option can be checked or unchecked to select or clear that option.

The application typically creates a user input box, such as a dialog box, when the user clicks the menu item. The application typically destroys the dialog box immediately after the user supplies the information or closes the dialog box. For example, the user can close the dialog box by clicking on an OK button to accept the data shown, entering new data and clicking on the OK button, clicking on a cancel button to close the window without entering new data, or clicking on a close window button.

Many applications also use dialog boxes to display information or options while the user works in another window. For example, word processing applications often use a dialog box that provides a text search option. While the application searches for the text, the dialog box remains on the screen. The user can then return to the dialog box and search for the same word again, or the user can change the entry in the dialog box and search for a new word. Typically, the application creates the dialog box when the user clicks the menu item and continues to display the dialog for as long as the application runs or until the user explicitly closes the dialog box.

Some types of display windows do not typically receive input from the user. For example, HTML provides the ability to display a tool tip, which is a small context window that includes descriptive text displayed when the user moves the pointer over the context window. Unlike a link, the tool tip is activated when the user points to the context window containing the descriptive text. The descriptive text within the context window is normally distinguished from other plain text in the user interface to indicate to the user that the descriptive text within is actionable. For example, the descriptive text may have a visible context window border or be underlined to visually distinguish the descriptive text from other plain text. However, while tool tips can display data related to the actionable user interface object, tool tips are typically used as a help utility to display a fixed text informing the user of the functionality provided by an actionable user interface object. Typically, tool tips are not persistent, such that the tool tip appears when a pointer to the descriptive text hovers for a short period of time, and the tool tip disappears after another short period of time. Furthermore, tool tips typically do not provide a mechanism for the user to provide input or otherwise interact with the tool tip to obtain additional information about the data displayed within the context window.

Windows allow the user to view information and return to the previous task without closing the window or providing input. Such a window is referred to as a modeless window. In contrast, a window that requires the user to either supply additional information or explicitly close the window is referred to as a modal window. Applications use modal windows, for example, in conjunction with menu items that require additional information before proceeding. The user cannot switch back to the host window that opened the modal window until the modal window is closed. In other words, the modal window retains input focus and receives user input from the keyboard or mouse until the modal window is closed. Modal windows are simpler to manage than modeless windows because they are created, perform their task, and are destroyed by calling one or more functions in the display code for the window. However, modal windows do not allow a user to switch tasks at will.

A sidebar window typically is a narrow window providing a limited number of selection options and/or a limited amount of data. Because a sidebar window and its contents are often referred to collectively as a sidebar, the term sidebar is used herein to describe both the sidebar window and the contents of the sidebar window. The sidebar window is typically presented in conjunction with a larger display window that has space to display more data about a particular selection in the sidebar window. For example, sidebars may provide information such as news headlines or other content item descriptions, where the content item itself is available by clicking a hyperlink, also referred to herein as a link, associated with the content item description. When the link is activated, the content item itself is typically displayed in a new window, thereby overlaying both the larger display window and the sidebar window.

The sidebar window and the larger display window can be siblings opened by a common parent window or in a parent/child relationship to one another. Either the sidebar window or the display window can serve as a host of the other. For purposes of discussion of sidebar windows in this document, the term sidebar window is not limited to a window being presented on the left hand side of the larger display window. The term sidebar window or sidebar is also used to refer to a window having a limited area for displaying data, whether the window is displayed on the left hand side, right hand side, top, or bottom of the larger display window.

The web operates under a request/response model for a client/server environment, with the web client requesting a web page and the web server providing the web page in response to the request. A web server does not independently send web pages to the web client without first receiving a request for the data from the web client. Furthermore, the web client and web server are connected only for the amount of time it takes to send a response to the request, or, in a limited number of implementations, for a short period of time after receiving the response to determine whether additional data are needed immediately. Such a brief connection after the response is received is sometimes referred to as a keep-alive connection, but most busy web servers do not provide keep-alive connections. Typically, no persistent connection is provided between a web server and web client when a request for a web page is not pending, thus limiting the web server's ability to communicate information to the web client. The web client's ability to operate on server-provided data without sending a request to a server is limited because the data are provided within an HTML document. Sending a request whenever additional data are needed expends resources and adds to congestion over the network between the client and server.

When data are displayed within the same user interface but in different windows simultaneously, most applications try to ensure that the data are consistent to avoid user confusion. Providing data consistency between user interfaces implemented using web browsers poses several challenges. For example, each web page provided by a web browser within a single user interface is typically provided by a different web browser instance that is independent of the other web browser instances. When the web page allows the user to change data, the web browser instance receiving the change to the data displayed by the web page sends a request to a web server to make the change. The web server changes the data and sends a response to the web browser instance that requested to make the change, where the response indicates that the change has been made. Because web browser instances must send a request to the server to receive updated data, to ensure consistent simultaneous data presentation, either web browser instance must continuously send requests to determine whether the data that it is capable of displaying has changed. This solution is described as polling, but polling greatly adds to the number of request to which the web server must respond, potentially overwhelming the web server. Another solution is to provide a persistent connection to the web server, but then only a limit number of web browser instances can be supported by each web server.

Due to the limitations of HTML, text such as a news headline wraps around to fit the entire text of the headline inside the window in which the text is presented. This wrap-around text uses additional vertical space in the window, thus limiting the number of content item descriptions, such as headlines, that can be presented in the limited space provided in a window such as a sidebar.

To avoid this problem and enable additional content item descriptions to be displayed within a narrow window, HTML provides the ability to truncate text instead of wrapping the text around to a second line. However, when the text of the content item description is truncated, the user cannot view the full text of the content item description from within the narrow window, even by scrolling the content items descriptions in the narrow window. Furthermore, no indication that the text has been truncated is provided, and the user may be unable to discern whether the content item is of interest solely from the truncated content item description. Therefore, the user must click on a link to view the available content without knowing whether the content item is of interest. This requirement defeats the purpose of providing a content item description in the window and greatly limits the usefulness of the window to the user.

What is needed is the ability to provide the capability for the user to obtain additional information about available content from within a limited area, such as a sidebar.

SUMMARY OF THE INVENTION

The present invention includes an apparatus, method, computer system, and computer program product to optimize space available for displaying descriptions of content in a limited area, such as a sidebar. Space is optimized by displaying only the maximum portion of the text describing each selection that will fit within the limited area, thereby allowing space to display additional selection item text descriptions in the remaining portion of the limited area. In one embodiment, a thin scroll bar is also provided to give additional space to display the maximum portion.

In one embodiment, positioning a pointer, such as a cursor displayed by a mouse, over the maximum portion of the text causes the complete portion of the text to be displayed. In some embodiments, the complete portion of the text can be displayed on one horizontal line to maximize the vertical space within the limited area. In these embodiments, a web page that was being displayed in the main browser window at the time that the pointer was positioned continues to be displayed. The complete portion of the text can serve as a link to a content item described by the text.

In another embodiment, when the link with reference to the complete portion is clicked, information related to the text can be displayed in a main browser window. The limited area displaying the maximum portion of the text continues to be displayed when information related to the text appears in the main browser window.

In still another embodiment, space is optimized by using a thin scroll bar to provide additional space to display content within a window. The thin scroll bar can be used for a window with contents provided by a client application. The thin scroll bar can also be used for a window in a client application displaying server-provided content, such as a web page having a scrollable area.

BRIEF DESCRIPTION OF THE DRAWINGS

The present invention may be better understood, and its numerous objectives, features and advantages made apparent to those skilled in the art by referencing the accompanying drawings.

FIGS. 3A through 3I provide examples of user interfaces produced by a system implemented in accordance with one embodiment of the invention.

FIG. 3A shows the detailed visual portions of the embodiment of the sidebar of FIG. 1.

FIG. 3B shows an example of a menu presenting options for modules that can be selected for a given pane in the sidebar of FIGS. 1 through 3A.

FIG. 3C provides an example of a module toolbar for a mail module.

FIG. 3D provides an example of a module toolbar for a calendar module.

FIG. 3E shows an example of a complete content item description provided by a text presentation control that can be used in the sidebar of FIG. 1.

FIG. 3F shows an example of the complete content item description provided by the text presentation control of FIG. 3E when the host application window has been resized.

FIG. 3G shows an example of a web page provided when the complete content item description of FIG. 3E is clicked.

FIG. 3H shows an example of a slideout window provided when a user clicks on text for a content description in a calendar module.

FIG. 3I shows the result of clicking on the event details link of FIG. 3H.

FIG. 11 shows a data flow notifying sidebar control programs to update data displayed in the sidebar in response to a change to data within the independent application window described with reference to FIGS. 10A and 10B.

The use of the same reference symbols in different drawings indicates similar or identical items.

DETAILED DESCRIPTION

Figure 1:
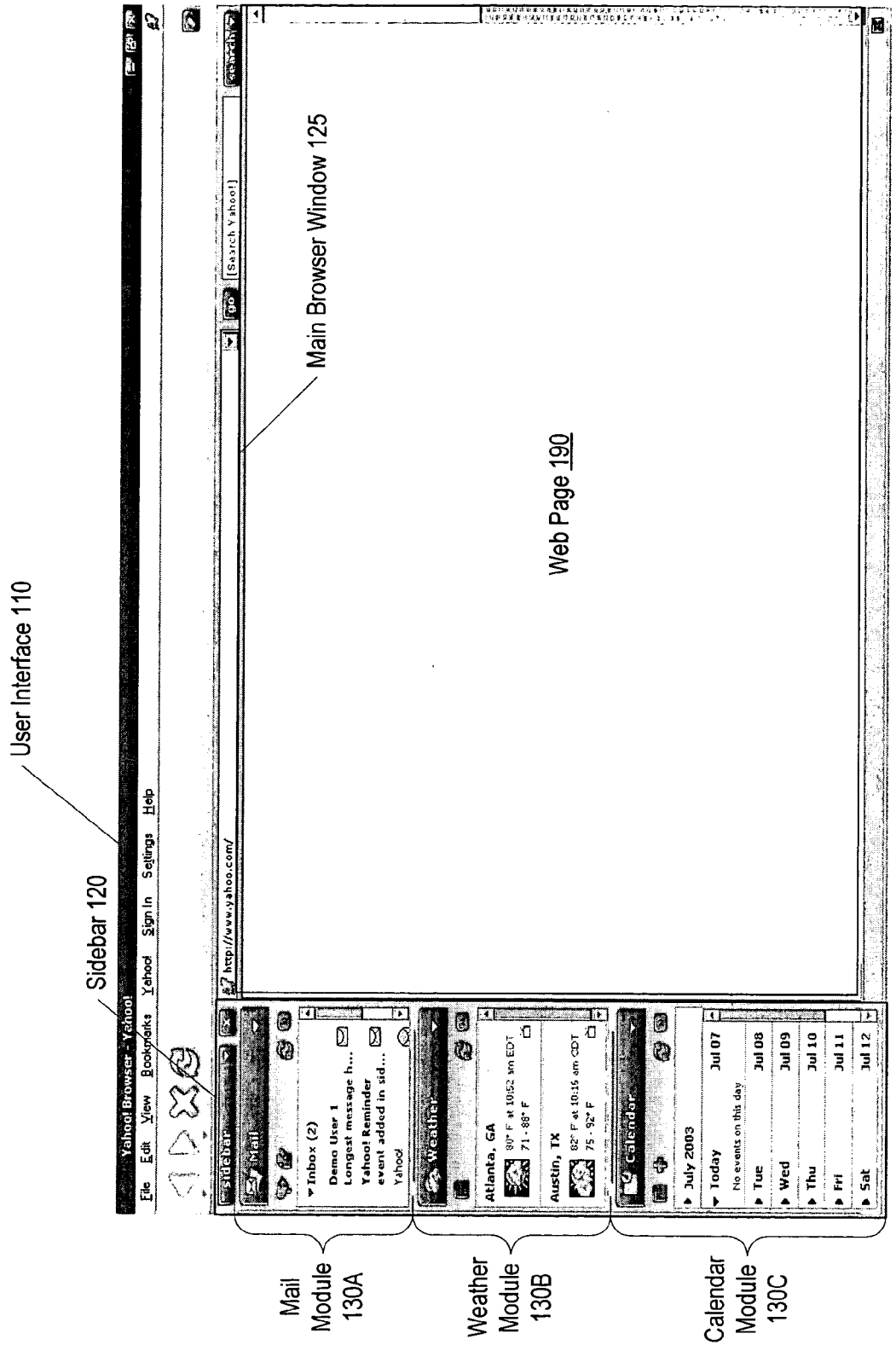
FIG. 1 is an example of a user interface provided by components implemented in accordance with one embodiment of the invention.

For a thorough understanding of the subject invention, refer to the following Detailed Description, including the appended claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

Described herein is a system designed in accordance with a framework having many inventive features that provide a user-friendly, sophisticated user interface. An example implementation of this framework is described in detail with reference to FIGS. 4A through 11 below, and particularly with reference to FIGS. 4A, 6 and 10A. The system providing the user interfaces shown herein operates in accordance with this framework and uses web browsers processing HTML documents to produce web pages. The system is capable of incorporating both client-side and server-side functionality and is easily extended to provide additional functionality without the need to change an application program on the client. This system serves as an example of a system in which the present invention can be used, although it is not a requirement that every feature provided by the framework be used for the invention to operate.

The components described herein that can be used to implement the invention operate in accordance with the Component Object Model (COM), which is a standard (not a product) that defines how components interact to provide functionality. Microsoft provides a technology referred to as "ActiveX" that operates in accordance with the COM standard and provides for the implementation of components referred to as "Active X controls." Other software companies have implemented components using other technologies, but also refer to their components as "controls." It is not a requirement of the invention that the controls described herein are implemented using ActiveX or any other technology. In common practice, the term control is sometimes used to refer to the control software program as well as to the visual portion of the user interface that is displayed by the control software program. However, to clarify the terminology used herein, the control software program is referred to as a "control program," and an instantiation of an object to provide the functionality of the control program is referred to herein as a "control instance." The visual portion displayed by the display code of the control program is referred to as a "control window." When the visible portion is a control window that includes a web page, the terms "web page" and "control window" are used interchangeably because a web page is presented within a window by default by a web browser control. For consistency, a program that is not a control, such as a web server program, is referred to as a "program," and an executing version of the program is referred to as an "instance." For example, instances of web server programs are referred to herein as "web server program instances," instances of applications are referred to herein as "application instances," and executing scripts are referred to as "script instances."

The term script is used herein to refer to a program downloaded in an HTML document and executed by a web browser. One of skill in the art will understand that the use of the term script is not intended to be limiting and simply serves as an example of a type of program that can be executed within a web browser. Another type of program that can be executed within a web browser is binary code. Binary code is interpreted by a program or hardware processor that is capable of understanding the format of instructions and data within the binary code.

Binary code that is interpreted by a hardware processor is often referred to as "executable code," "object code," or "native code." For example, many computer languages, such as C and C++, require that a separate compiler be used to produce binary code for each computer platform—that is, for each computer operating system and the hardware set of instructions upon which the platform is built. The correct compiler must create the binary code for the hardware processor to execute the binary code.

One example of binary code interpreted by a program is bytecode. A program usually referred to as virtual machine processes bytecode, rather than the hardware processor. The virtual machine converts each generalized machine instruction into a specific machine instruction or instructions that the host computer's processor will understand. Bytecode is the result of compiling source code written in a language supported by a given virtual machine. One example of a language that uses the bytecode and virtual machine approach is Java.

A control that enables a user to view web pages is referred to as a web browser control. A web browser control receives an HTML document as input and displays a web page for browsing (viewing) by a user. Because the web page is provided within a window by default, the web page is also referred to herein as a control window. For example, a web browser application, such as Microsoft Internet Explorer, provides web browsing functionality and serves as a host for a web browser control. The host application serves as a container for the web browser control, which, in turn, can serve as a host or container for another control. The other control can considered to be nested within the host control that serves as its container.

Using a web browser control, web pages can be browsed and data (embedded within or referred to within a web page) can be downloaded. Furthermore, a web browser control supports running scripts that are embedded in a web page. Web browsing is supported through both point-and-click hyperlinks and Uniform Resource Locator (URL) navigation to a web page. A standard web browser control supports scrolling automatically when the web page is too large to fit within the window provided by the web browser control, window resizing, and other standard window functionality.

As a result of the requirement that a component or control run within a container/host application or control, executable code for the control must be accessible to the container to load and run. In a client/server environment, the container can be a client application program, so that executable code must be accessible by the client computer system. In a client/server system operating under a request/response model, either the control executable code must be installed on the client computer system (as a .EXE file or other binary file) or the client must send a request to obtain executable code in the form of a response (HTML document) from the server. The HTML document can provide executable code in the form of scripts or control executable code, such as a dynamic link library (DLL) file. The request establishes a connection between the client and the server that is otherwise not provided when a request is not pending. This requirement has limited the ability of enterprises desiring to provide sophisticated user interfaces for applications that are to be accessed via the Internet.

Figure 1A:
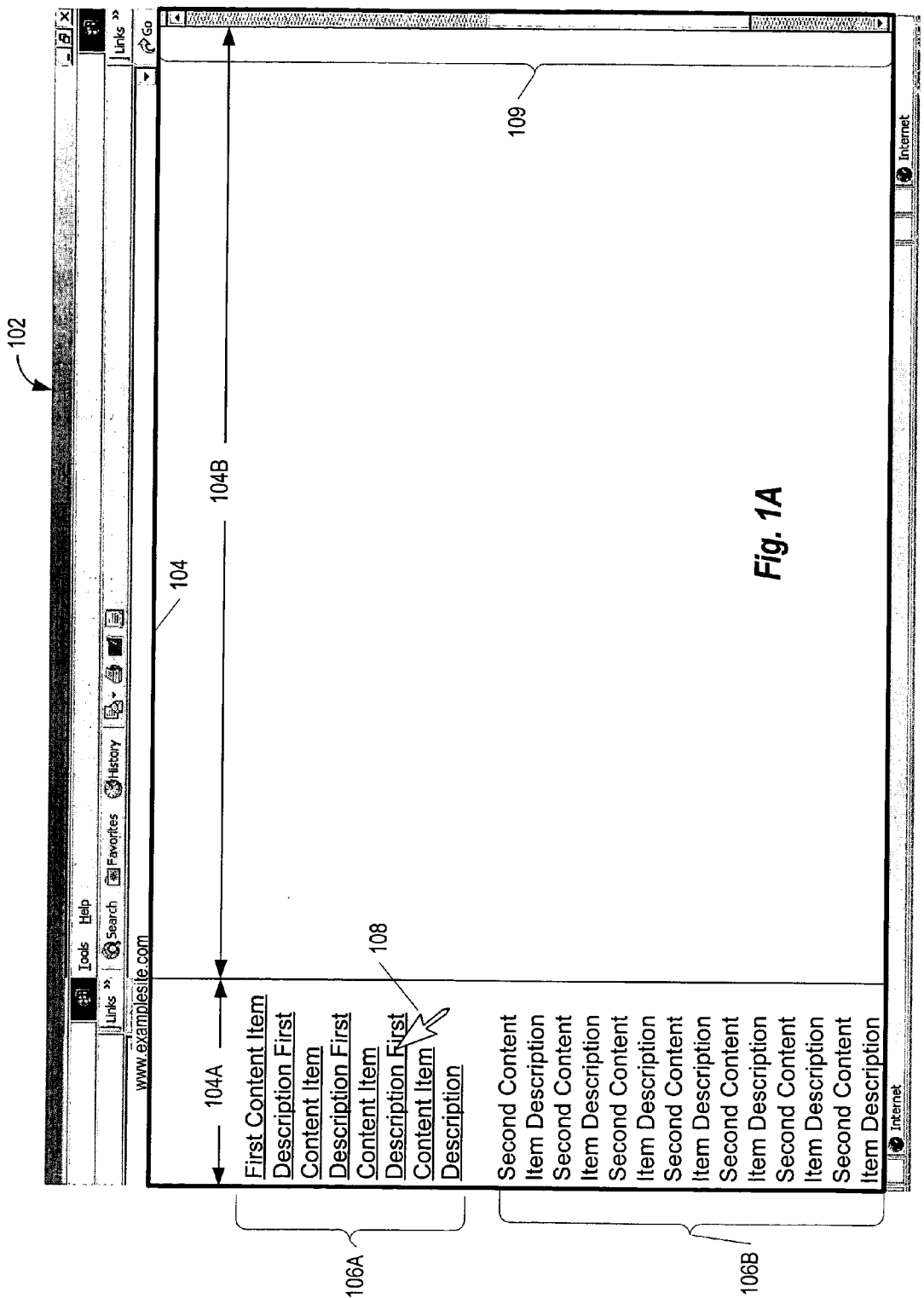
FIG. 1A is an example of a user interface for a web application.

FIG. 1A is an example of a user interface for a web browser application. Browser window 104 includes columns 104A and 104B and scrollbar 109. Scrollbar 109 is included within a browser window, such as browser window 104, only when the contents of the web page cannot be displayed within the vertical space available to the browser window. Each of columns 104A and 104B within browser window 104 can display content items in the form of web pages and/or links to web pages. In column 104A, descriptions of content items are shown, such as content item descriptions 106A and 106B. When one of the content item descriptions is selected, typically a web page is presented within browser window 104, overwriting columns 104A and 104B.

Content item description 106A is selected by pointer 108 by positioning pointer 108 over the text of content item 106A.

Pointing to a user interface object in this manner is sometimes referred to as a mouseover event, mouseover, rollover event, rollover, hover event, or hovering. When a pointer is positioned over a content item description, such as pointer 108 over content item description 106A, and no separate icon or button is displayed for the user to activate, the content item description is typically, but not necessarily, underlined (as shown for content item description 106A) to indicate to the user that the content item description is an actionable user interface object, providing a link to a related content item. An actionable user interface object can be activated by performing another event, such as clicking pointer 108 on the link represented by content item description 106A. Activating the text displayed as a content item description 106A invokes the web browser, which sends a request to a web server and receives an HTML document that is processed to display the content item/web page (not shown).

Content item description 106B is not underlined because pointer 108 is not positioned over the respective content item description and the link to the associated content item web page cannot be activated without first positioning pointer 108 over content item description 106B. The multi-line displays for content item descriptions 106A and 106B limit the number of content item descriptions that can be displayed within browser window 104, particularly when the content item descriptions are very long.

The system and methods described herein optimize space available for displaying text descriptions in a limited area, such as a sidebar. In one embodiment, space is optimized by displaying only the portion of the text describing each selection that will fit within the limited area, thereby allowing space to display additional selection item descriptions in the remaining portion of the limited area. In some embodiments, a thin scroll bar is provided to maximize the available space within the limited area for the maximum portion of the text. To compensate for the display of a very limited amount of text describing the content, a complete portion of the text is accessible by pointing to the maximum portion of the text that is displayed. For example, a user may position a pointer, such as a mouse, with reference to the maximum portion of the text that is displayed.

The complete portion of the text is displayed in response to a mouseover event occurring with reference to the maximum portion that is displayed. In some embodiments, in response to a mouseover event with reference to the maximum portion of the text, the complete portion of the text is displayed on one horizontal line to maximize the vertical space within the limited area. The complete portion of the text can serve as a link to the information described by the maximum portion of the text in response to a second event, such as a click event, occurring with reference to the complete portion of the text.

In contrast to the behavior of a standard link, in another embodiment, the window displaying the maximum portion of the text does not disappear after the link with reference to the complete program is clicked. In addition, a web page that was being displayed in a main browser window at the time that the mouseover event occurred is not replaced. The limited area displaying the maximum portion continues to be displayed when the information described by the complete portion of the text appears in the main browser window.

FIG. 1 is an example of a user interface provided by components implemented in accordance with one embodiment of the invention. A user interface 110 includes a sidebar 120 and a main browser window 125. Web page 190 is presented in main browser window 125 (content details not shown). In the example shown, the application presenting user interface 110 uses standard HTML documents as input to display sidebar 120 and web page 190. Sidebar 120 is presented with three panes providing user interfaces for selected sidebar modules. In the example shown in FIG. 1, sidebar 120 includes panes for three sidebar modules, a mail module 130A, a weather module 130B, and a calendar module 130C.

In the embodiment shown in FIG. 1, each of sidebar modules 130A, 130B, and 130C within sidebar 120 can be implemented as either a web browser control, in which case the sidebar module displays a web page by interpreting an HTML document obtained from a web server using standard HTML, or as a client control, where the client provides the source code and functionality for the sidebar module.

Figure 2:
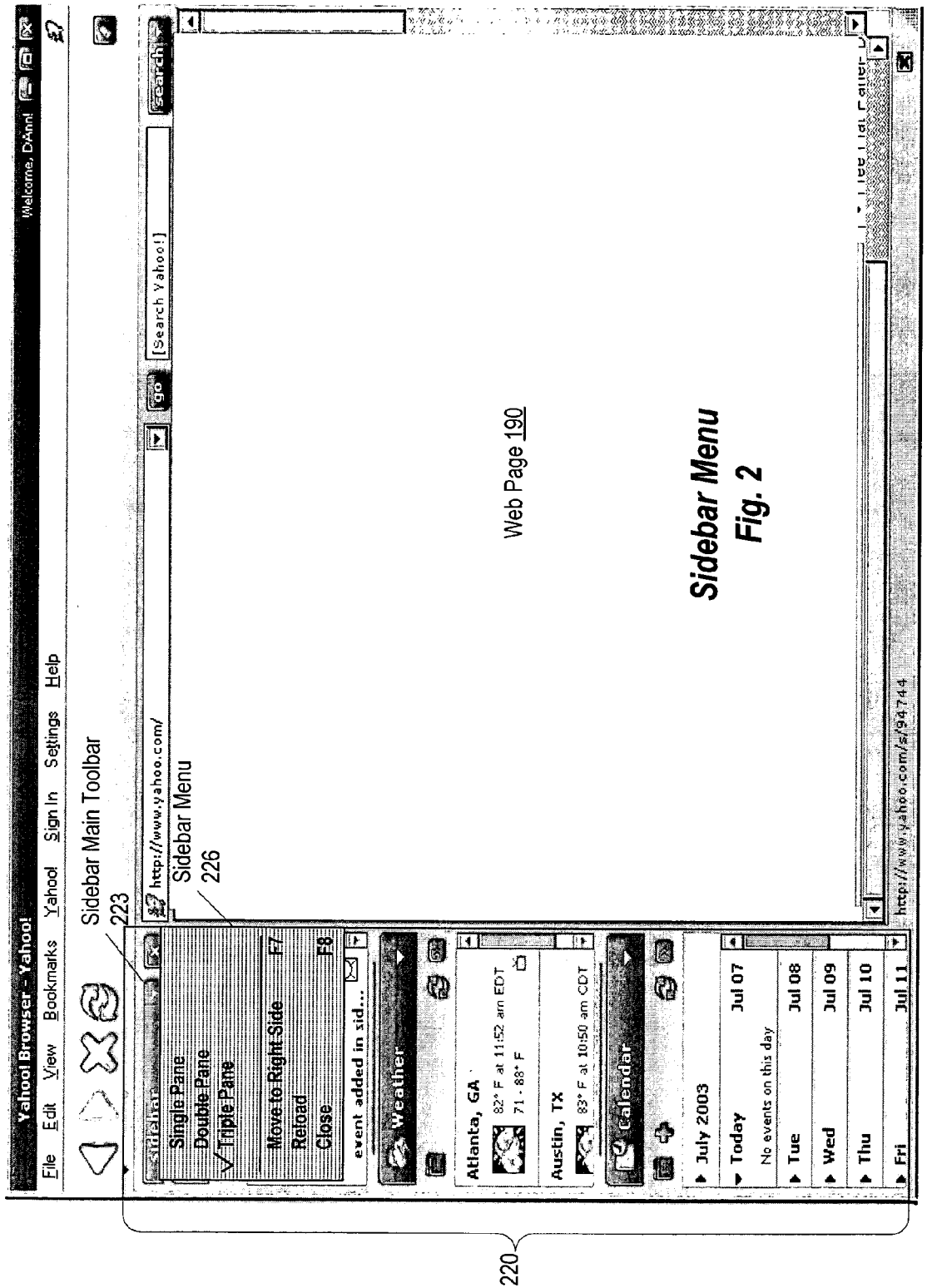
FIG. 2 shows a menu of configuration options for a sidebar provided by components implemented in accordance with one embodiment of the invention.

FIG. 2 shows a sidebar 220 with a main sidebar toolbar 223 and a menu 226 presented by main sidebar toolbar 223. Menu 226 is an example of a menu provided to allow the user to specify a configuration for a specialized window such as sidebars 120 and 220.

In the embodiment shown, up to three panes can be selected, although any number of panes and/or modules can be supported in a sidebar implemented in accordance with the invention. The checkmark next to the Triple Pane option indicates that three panes are currently active, as shown, with one of the three panes hidden by menu 226. Other options include an option to move the sidebar to the right side of the screen, to reload the sidebar, and to close the sidebar. In one embodiment, menu 226 is implemented by a menu presentation control that provides an interface through which a calling program can provide text for the options provided on the menu. It is not required that the menu presentation control be implemented within the framework for the system described herein. In one embodiment, configuration data such as the configuration options specified using menu 226 are stored on a server and provided to the client when the specialized window is to be displayed.

Referring to main sidebar toolbar 223, a toolbar is a control window that contains one or more buttons. Each button, when clicked by a user, sends a message to the application or control program hosting the window within which the button is provided. When the application or control program receives the message, the application or control program performs a command indicated by the message. Typically, the buttons in a toolbar correspond to commands in the application's or control's menu, providing an additional and more direct way for the user to access an application's or a control's commands. In this example, main sidebar toolbar 223 provides a button that provides a dropdown menu, such as menu 226, when clicked, in addition to the standard close window button.

Figure 3A:
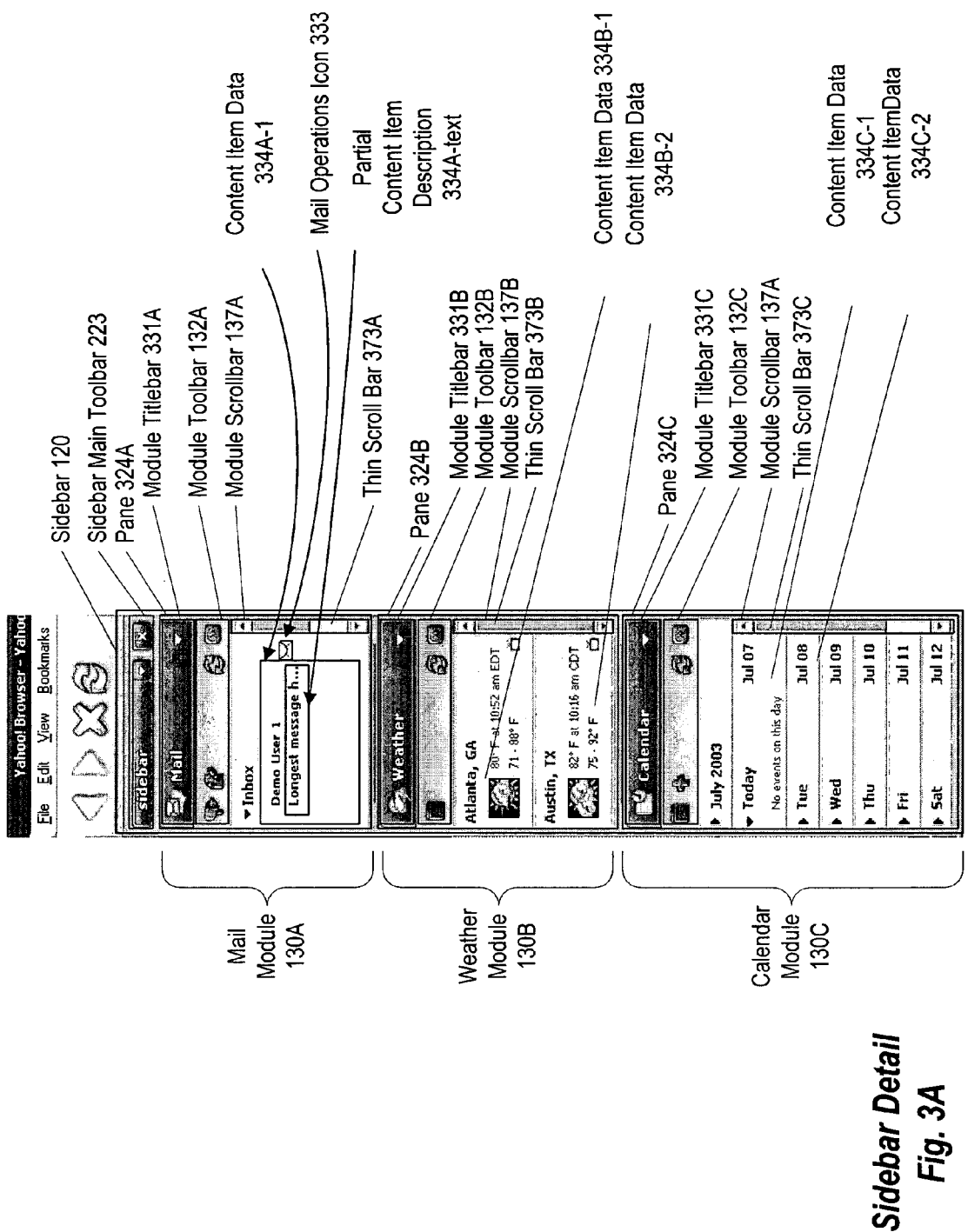

FIGS. 3A through 3J provide examples of user interfaces produced by a system implemented in accordance with the framework described above. FIG. 3A describes the detailed visual portions of a sidebar, using the example of sidebar 120 of FIG. 1. As described with respect to FIG. 2, sidebar 120 includes sidebar main toolbar 223.

Referring to FIG. 3A, in one embodiment, sidebar 120 is rendered as a single web page by an ActiveX control, which is instructed to configure the display of sidebar modules within sidebar 120. As mentioned above, it is not a requirement of the invention that sidebar 120 be rendered by a control implemented using Active X or any other technology. Three panes are shown in sidebar 120, with a pane 324A hosting mail module 130A, a pane 324B hosting weather module 130B, and a pane 324C hosting calendar module 130C. Each of panes 324A, 324B, and 324C of sidebar 120 includes a module titlebar, respectively module titlebars 331A, 331B, and 331C, here entitled "Mail," "Weather," and "Calendar."

The module titlebar can provide a shortcut menu of options for a user to select a sidebar module to include in the respective pane of the sidebar. In one embodiment, the module titlebar is implemented by the separate menu presentation control configured to operate within the framework described herein, as described with reference to FIG. 2. Module titlebars 331A, 331B, and 331C enable the user to customize a pane within the sidebar to display data for one of a number of available sidebar modules. The list of available sidebar modules is provided by a server in communication with the application presenting the user interface. An illustration of the menu of sidebar module options provided by each of module titlebars 331A, 331B, or 331C is given in FIG. 3B.

FIG. 3B shows an example of a menu presenting options for sidebar modules that can be selected for a given pane in sidebar 120 of FIG. 1. By clicking on module selection button 331A button, the user is presented with options for selecting the sidebar module to appear in the respective pane in module options menu 312. As shown by the checkmark next to the "Mail" module option, the mail module is currently selected for the respective pane (although the mail module is partially hidden by module options menu 312).

In one embodiment of the system implemented according to the framework described herein, the list of choices of modules is provided by a server within an HTML document, which includes embedded data describing the available sidebar modules and an embedded script to cause the menu presentation control described above to render module options menu 312. With the server controlling the list of available sidebar modules, the client application program using the sidebar, such as the Yahoo! browser shown in the example, can be distributed once, without the need to upgrade the client application program when new sidebar modules become available. This framework enables the client user interface to be easily extensible to perform new functionality.

Referring again to FIG. 3A, each pane 324A, 324B, and 324C in sidebar 120 can be manipulated like an ordinary window; for example, each pane can be resized, and the other two panes within sidebar 120 are resized in response to enable as much data as possible to be displayed for all three sidebar modules. The sidebar can be configured to intelligently display relevant data when the corresponding pane is resized. For example, in the calendar module, when pane 324C is made smaller, content descriptions with dates farthest from the current date can be eliminated from the display within pane 324C. The current date and other dates that can be displayed within the smaller pane are displayed.

Each of panes 324A, 324B, and 324C includes a respective module toolbar 132A, 132B, and 132C. Module toolbars 132A, 132B, and 132C include icons specific to the module for which data are being displayed in the respective pane. Module toolbars are described in further detail in FIGS. 3C and 3D.

Figure 3C:
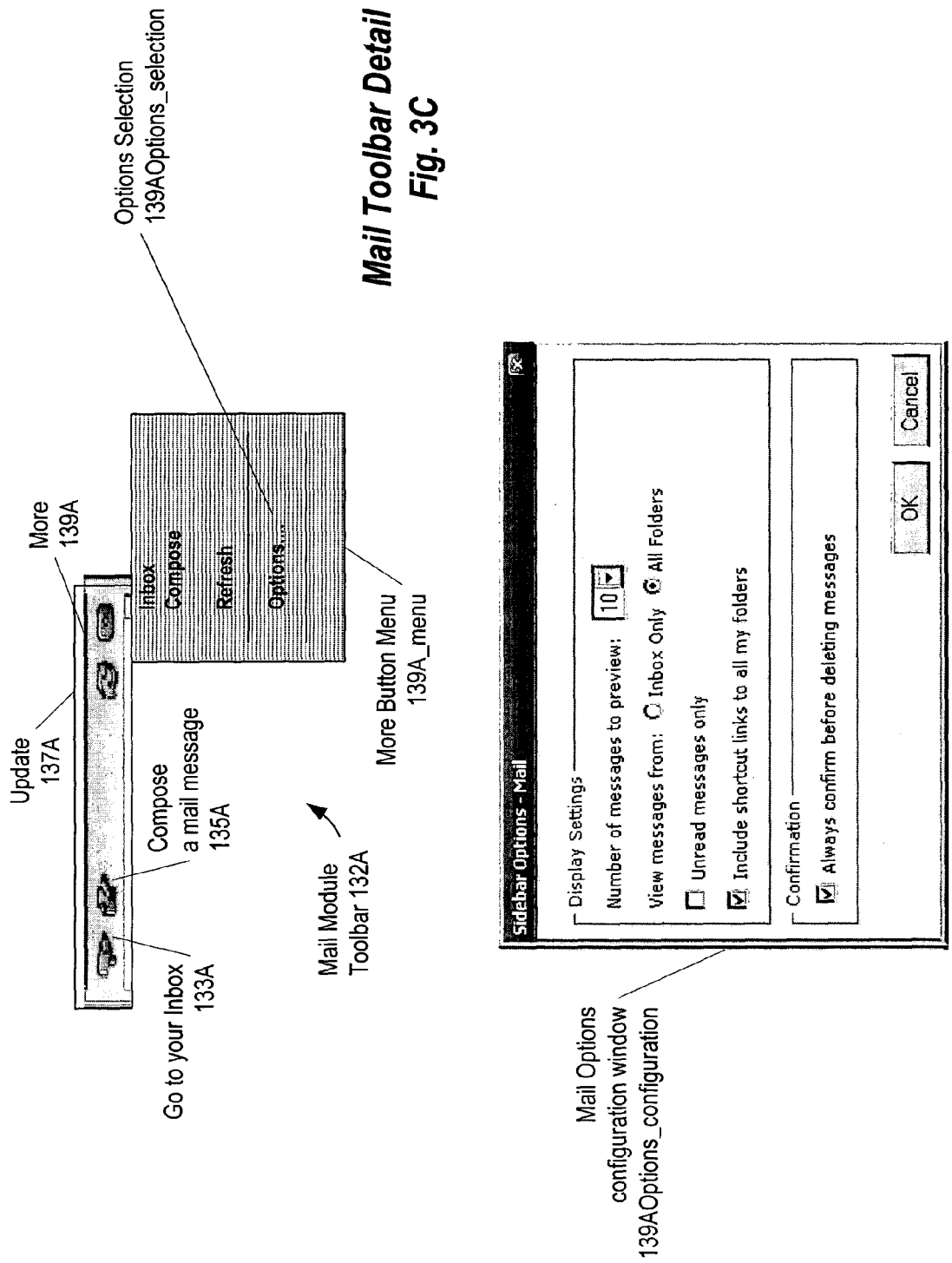

FIGS. 3C and 3D provide examples of module toolbars for mail module 130A and calendar module 130C of FIG. 1. In FIG. 3C, mail module toolbar 132A includes buttons 133A, 135A, 137A, and 139A. Inbox button 133A enables the user to go to the user's Inbox, which will appear in the display window adjacent the sidebar, such as main browser window 125 of FIG. 1. Compose button 135A provides a separate window in which the user can compose and send a mail message, without affecting the web page that is currently displayed in the display window adjacent the sidebar, such as main browser window 125 of FIG. 1. An example of a new browser window in which a mail message can be composed is provided in FIG. 3K discussed below. In one embodiment, refresh button 137A can update, or refresh, the data displayed by the mail module 130A in both the sidebar and the display window if the mail module is currently displayed in the display window; this functionality is described further with reference to FIGS. 10A, 10B and 11 below. More button 139A provides a menu such as the menu shown in More Button Menu 139A_menu. More button Menu 139A_menu is another example of a menu presented by menu presentation control described with reference to FIG. 2.

When options selection 139AOptions_selection is selected, a configuration window for presentation of the mail module within the sidebar appears. Mail Options configuration window 139AOptions configuration provides an example of such an options configuration window. In the example shown, the user can select a number of messages to preview, choose folders from which to view messages, indicate whether unread messages only are to be displayed, indicate whether to include shortcut links to all folders, and select whether to provide a confirmation prompt whenever the user chooses to delete a message. These configuration options, also referred to as user preferences, are stored by the server and provided to the client whenever the mail module is to be displayed. These configuration options are used to configure the display of the mail module and data provided by the mail module when the mail module is displayed within the sidebar.

FIG. 3D provides an example of a module toolbar for a calendar module. Calendar module toolbar 132C includes buttons 133C, 135C, 137C, and 139C. Button 133C enables the user to go to Yahoo! Calendar, which will appear in the display window adjacent the sidebar, such as main browser window 125 of FIG. 1. Button 135C provides a separate window in which the user can add a new event to the calendar, without disturbing the web page currently displayed in the display window adjacent the sidebar, such as main browser window 125 of FIG. 1. Button 137C enables the user to refresh the data displayed by calendar module 130C in sidebar 120. Button 139C is a "More" button, which when clicked, provides a menu (not shown), such as More Button Menu 139A_menu in FIG. 3C having an options selection such as 139AOptions_selection. The user would choose the options selection and, in response, calendar options configuration window 139COptions_configuration would appear. In the example shown, the user can select a daily, weekly, or monthly view; specify a number of days to preview; provide start and end times for the user's workday; specify a number of hours in the user's workday; and designate a day of the week with which to start the calendar. These configuration options, also referred to as user preferences, are used to configure the display of the calendar module and data provided by the calendar module when the calendar module is displayed within the sidebar.

Referring again to FIG. 3A, displayed within panes 324A, 324B, and 324C are content item data for content items accessible via the respective sidebar modules. Pane 324A includes data for mail module 130A, with content item data 334A-1. In the example shown, content item data 334A-1 represents a mail message in the user's Inbox. Content item data 334A-1 also includes partial content item description 334A-text, which is described in further detail below, and mail operations icon 133. Mail operations icon 333 can be clicked to access a menu of options (not shown) for performing operations on the mail message represented by content item data 334A-1. For example, the menu can include options to read the respective mail message (here message 334A-1) within an existing display window, such as main browser window 125 of FIG. 1; read the mail message in a new window (thereby not affecting a web page displayed in main browser window 125); delete the mail message; mark the mail message as read; or flag the mail message for follow-up. In one embodiment, if the mail message is displayed in a second display window, such as main browser window 125 of FIG. 1, the control providing the second display window can be notified so that the data can be refreshed to be consistent with the change made in the sidebar mail module. Further details about such notifications are provided below with reference to FIGS. 10A, 10B, and 11, which discuss an embodiment of a system having such an event notification feature.

Mail module 130A and messages presented by mail module 130A, such as content item data 334A-1, are displayed in accordance with mail configuration options configured by the user using the configuration window discussed with reference to FIG. 3C. These mail configuration options are also referred to herein as user preferences.

Pane 324B includes data for weather module 130B, with content item data 334B-1 and 334B-2, showing weather for two cities selected by the user. Pane 324C includes data for calendar module 130C, with content item data 334C-1 and content item data 334C-2 (in addition to content item data for the dates Jul. 9-12, 2003 that are not labeled). Each set of content item data in the calendar module represents a given date and includes events scheduled for that date. None of the dates in the example of FIG. 3A have scheduled events.

Partial content item description 334A-text is provided by a text presentation control implemented within the framework described herein, although the text presentation control can be implemented and used outside the framework. The text presentation control described herein provides an interface through which a calling program can provide plain text and a URL associated with a web page to be displayed. Display code in the control program for this text presentation control presents the plain text, such as partial content item description 334A-1text, in a form that can be activated by the user to perform additional functions, as if the plain text served as an actionable user interface object. In this example, partial content item description 334A-text is truncated text from the subject line of the associated mail message.

In the example shown in FIG. 3A, partial content item description 334A-text is truncated, followed by an ellipsis to indicate that the partial content item description 334A-text includes additional text. The control program for the text presentation control determines the maximum portion of the content item description text that can be displayed within the sidebar (allowing for the addition of the ellipsis). This text presentation control is discussed in further detail with reference to FIGS. 3E, 3F, and 3G below.

Figure 3E:
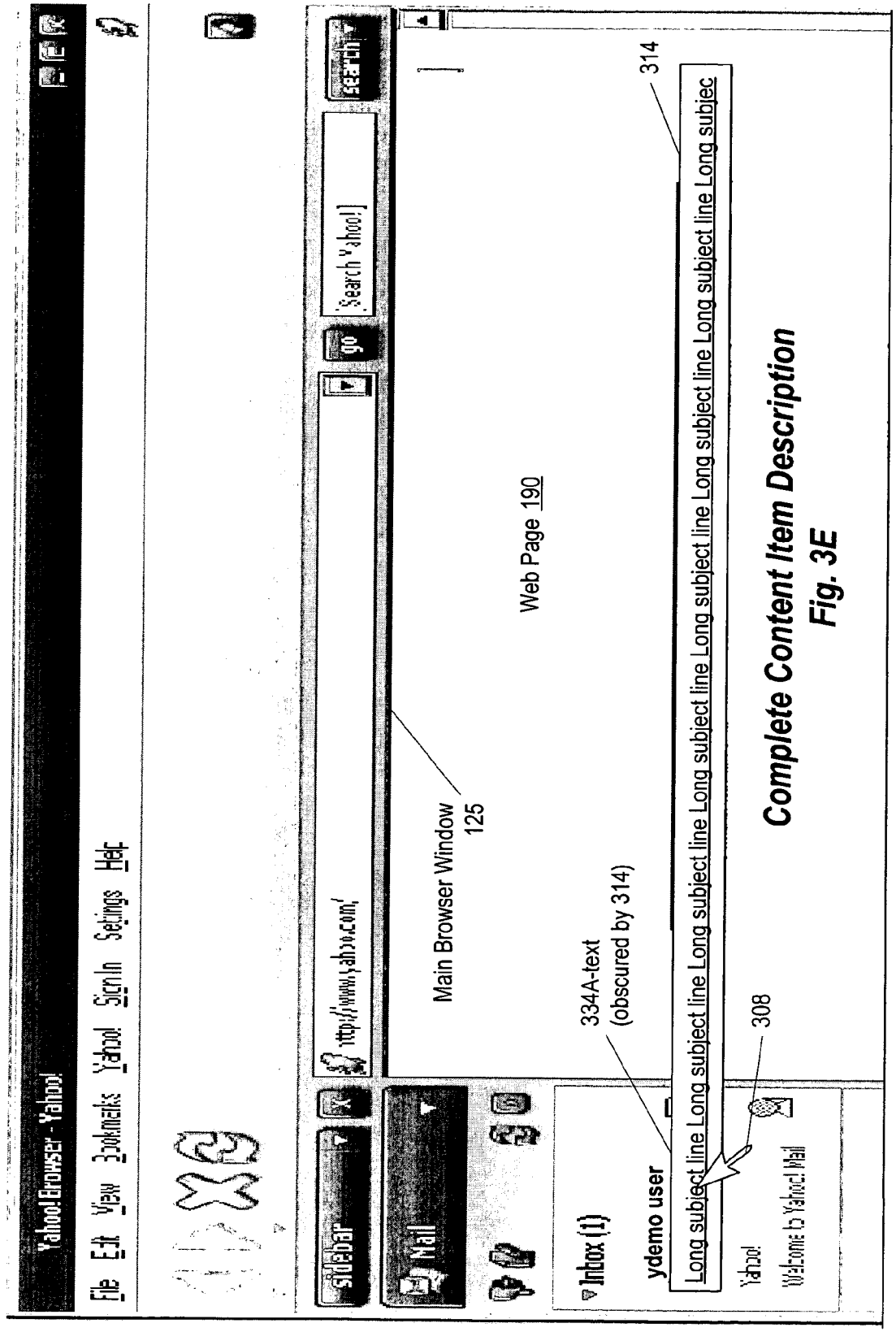

FIG. 3E shows the result of a mouseover event with reference to partial content item description 334A-text of FIG. 3A. In FIG. 3E, when a mouseover event occurs with reference to partial content item description 334A-text, a complete content item description 314 is displayed (overlaying content item description 334A-text in this example). The text presentation control underlines the text of complete content item description 314, indicating that the complete content item description 314 serves as a link to the content item described. When the user clicks on complete content item description 314, the associated web page/content item can be presented either within an existing display window, such as main browser window 125 of FIG. 1, or in a newly-created window, thereby enabling the web page within the existing main browser window to remain unchanged. This newly-created window enables the user to perform additional functions from within the sidebar, such as searching or viewing details about a particular content item, without changing the originally-displayed web page in the existing main browser window. In the example shown in FIG. 3E, complete content item description 314 overlays data displayed by web page 190.

FIG. 3F shows an example of a complete content item description 316 provided by the specialized text presentation control of FIG. 3E when the host application window 318 has been resized. The display of complete content item description 316 is not limited by the size of the window 318 containing the display for the host application. Instead, complete content item description 316 is limited only by the capabilities of the physical display device displaying the user interface for the host application. In contrast, HTML does not display information outside the host application window in which the text is presented (and thus wraps text within the sidebar, greatly reducing the space available for showing additional content descriptions). Complete content item description 316 overlays data displayed on the desktop of the computer system on which the client application is running.

FIG. 3G shows an example of a content item 334A-content_item (here a mail message) provided within a main browser window such as main browser window 125 when complete content item description 314 of FIG. 3E is clicked. Content item 334A-content_item is presented in main browser window 125 simultaneously with content item data 334A-1 being presented within the sidebar. In one embodiment, because the user can manipulate the mail message that is simultaneously being displayed by the sidebar, a control displaying data for the same content item in the sidebar can be notified so that the data can be refreshed to be consistent with the change made in the main browser window 125. Further details about such notifications are provided below with reference to FIGS. 10A, 10B, and 11, which discuss an embodiment of a system having such an event notification feature.

In one embodiment of the invention, a separate text presentation control such as that described with reference to partial content item description 334A-text of FIG. 3A is provided for each content item description displayed. When a pane for a module within the sidebar is resized, each of the multiple text presentation controls re-draws a respective image of the associated partial content item description within the module. In the embodiment with multiple text presentation controls, a large number of control windows on a web page slows scrolling of the web page, because the content item descriptions must be re-drawn repeatedly as the web page is scrolled.

In another embodiment, a single text presentation control such as that described with reference to partial content item description 334A-text of FIG. 3A is operable for all text within the sidebar. In the embodiment with a single text presentation control, HTML code for the module provides the specialized text presentation control with the text to be displayed, the dimensions of the pane in which the text is to be displayed, the font and color of the text to be displayed, and the name of a script function to invoke when the text presentation control is activated. The HTML code for the module requests the text presentation control to calculate the amount of text that can be displayed within the area available in the existing pane. The HTML code receives the amount of text from the text presentation control and displays that amount of text. Because HTML code is displaying the information, rather than several text presentation controls that repeatedly redraw the image, the web page appears to scroll more smoothly to the user. When a window containing text is resized in an embodiment with a single text presentation control, an executing script recognizes that the window has been resized and dynamically generates script instructions to display the text to conform to the resized window.

Upon detecting an event such as a cursor pointing to the truncated text, a script instructs the text presentation control to display the full text in that position. The text presentation control overlays the complete content item description on top of the web page generated from the HTML document. Overlaying the text enables the image to be displayed outside the boundaries of the host application window, functionality which currently is not possible using standard HTML.

One of the challenges of providing a text presentation control such as that described with reference to FIGS. 3A and 3E through 3G is providing the capability to correlate the HTML concept of font with the Windows operating system concept of font. HTML code is independent of the operating system in which the HTML code is run, whereas Windows commands are specific to the Windows operating system. Calculating text that can be presented within a given window such as a sidebar requires determining the size of the window (provided by the Windows operating system) and determining the number of text characters that can be presented by HTML code within that window. In one embodiment, this challenge was overcome by implementing "window size to text size" conversion functions as part of the text presentation control. In one embodiment, HTML tables are used to enable the text presentation control to display the truncated and full text as described above.

As mentioned above, it is not required that the text presentation control be implemented within the framework for the system described with reference to FIGS. 4 through 11 below. In one embodiment, the text presentation control provides an interface through which a calling program can provide text and a URL for a web page to be displayed. The interface also provides functions that can be used to specify a font for the text and behavior when the text is clicked.

Another feature provided by one embodiment of the system described herein is a slideout window providing additional information about the content item described by the content item description shown in the sidebar. The slideout window functionality is described further with reference to FIGS. 3H and 3I.

FIG. 3H shows an example of a slideout window 313 provided when a user clicks on text for a content item description 309 in the calendar module. In the example, the user has clicked on the text for content description 309 entitled "7:00 meeting," and slideout window 313 is presented. The user can view basic information about the event in the slideout window 313, and if desired, view event data details by clicking on link 315. Rather than acting as a link directly to the content item, content item description 309 serves as a way for the user to access additional information about the content item before deciding whether to click on the link. Furthermore, this additional information is available without replacing existing web page 190 displayed in main browser window 125.

Figure 3I:
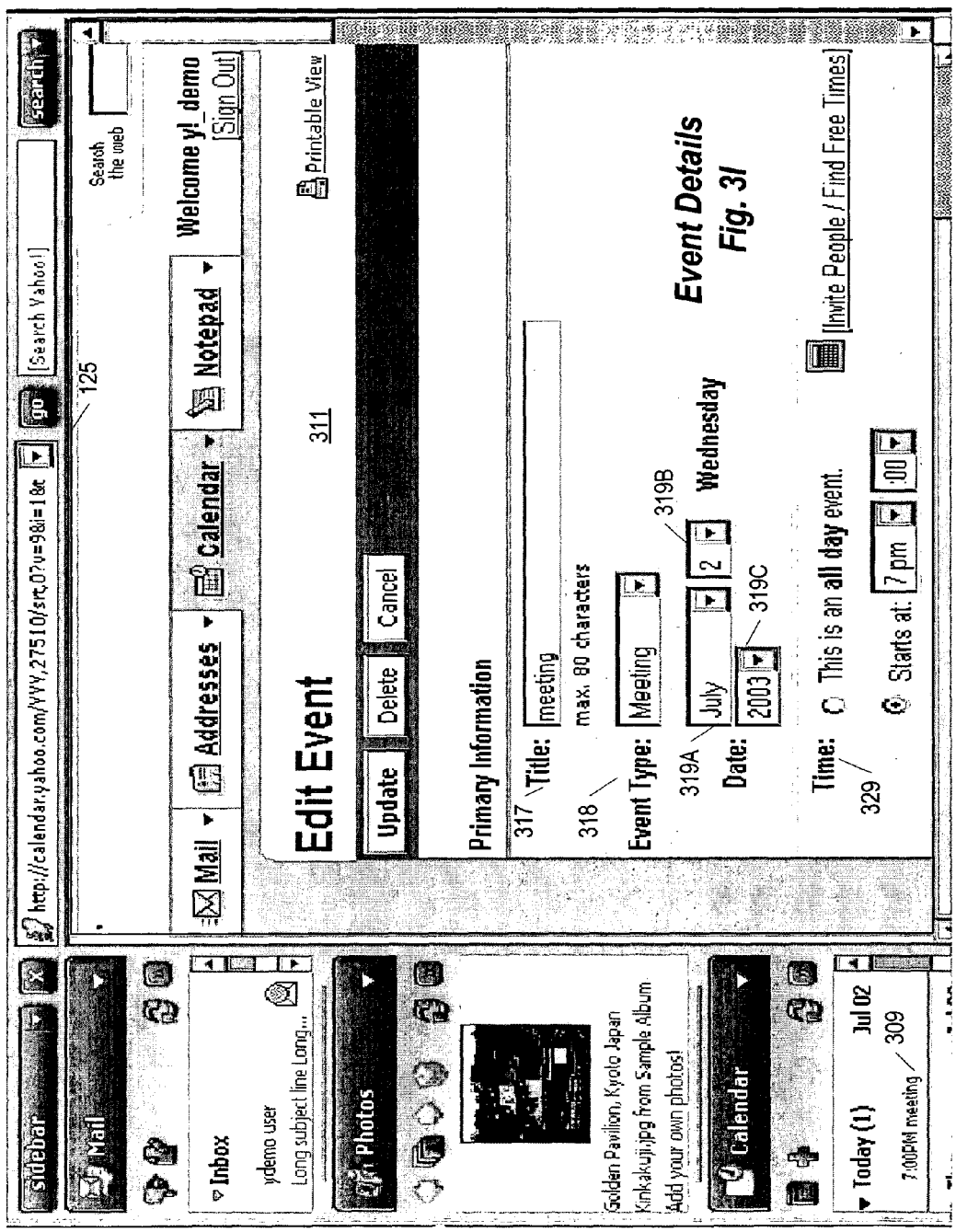

FIG. 3I shows the result of clicking on the event details link 315 of FIG. 3H. A web page 311 providing the event details for the event described in content item description 309 is opened in main browser window 125, replacing web page 190 previously displayed. Several fields can be updated, including title 317; event type 318; date 319A, 319B, and 319C; time 329, and several other fields not shown. When editing the event data is complete, the data entered is provided in the form of an HTTP request to the server originally providing web page 311. The server then posts the data to a server-side data store.

Figure 3J:
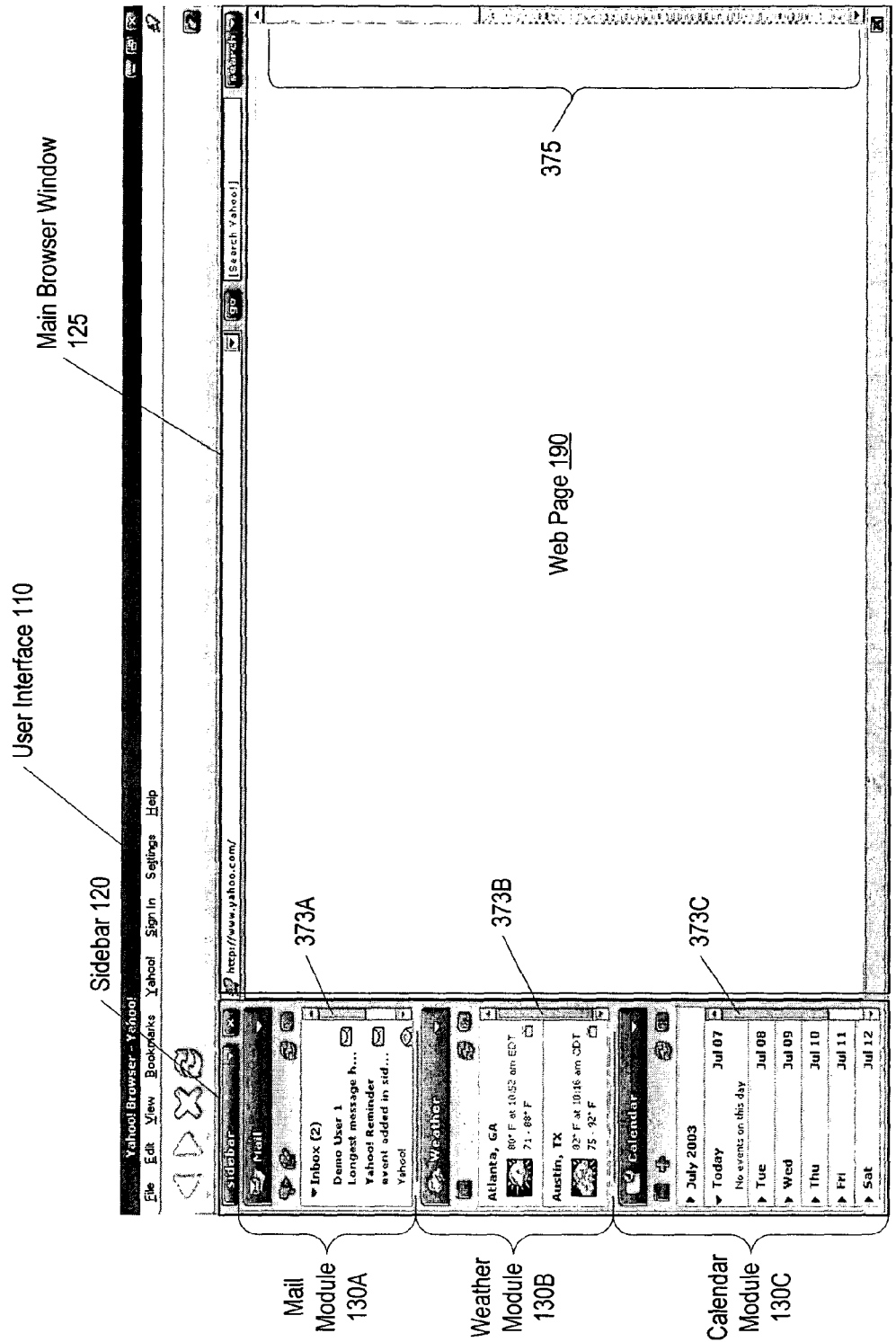
FIG. 3J shows an example of a thin scroll bar used within the sidebar of FIG. 3A.

FIG. 3J provides further discussion of thin scroll bars 373A, 373B, and 373C used in the sidebar of FIG. 3A. When the content to be displayed in a window is too large to fit within the window, a scroll bar is automatically provided as a function of the standard window control. However, few features of the scroll bar can be customized, and it is not possible to adjust the width of the scroll bar using HTML. With the very limited space of the sidebar, a thinner scroll bar can enable additional content item description text to be displayed.

In FIG. 3J, main browser window 125 has a standard width scroll bar 375, and each of modules 130A, 130B, and 130C has a respective thin scroll bar 373A, 373B, and 373C. In one embodiment of the invention, a control program intercepts standard window control messages sent to draw the scroll bar for each pane within sidebar 120 and draws a thinner scroll bar in place of the scroll bar provided by the standard window control. The control program provides scrolling instructions and messages to reposition the thinner scroll bar within the window provided by the standard window control. This control program, and other controls used to implement the sidebar displayed in FIG. 3A, is described below with reference to FIGS. 4 through 11.

Figure 3K:
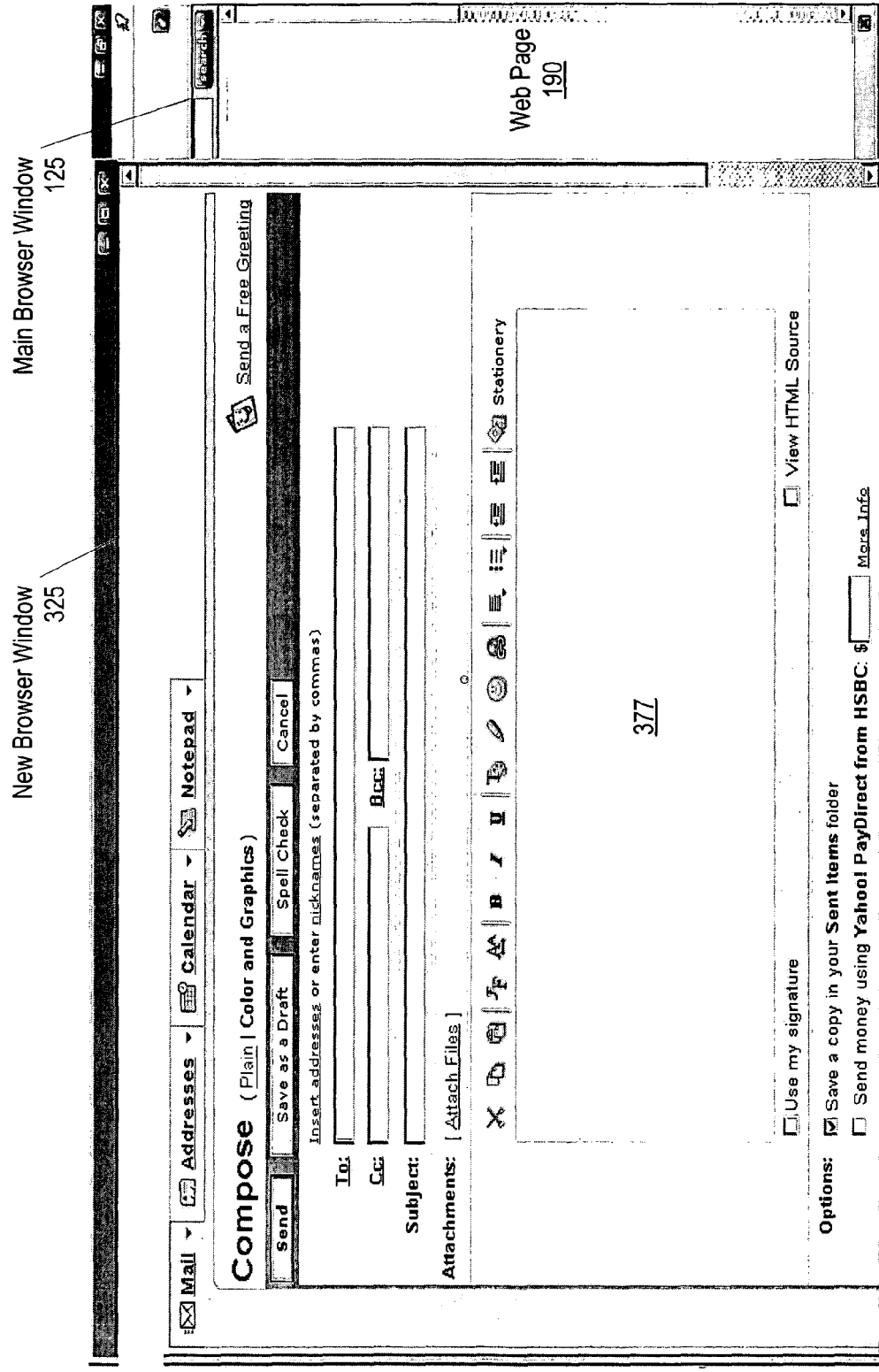
FIG. 3K shows an example of a new browser window opened by a component presenting a portion of the sidebar of FIG. 3A.

FIG. 3K shows an example of a new browser window 325 opened by a component the compose button 339B discussed with reference to FIG. 3C above. Compose web page 377 overlays main browser window 125 but, when closed, main browser window displaying web page 190 remains unchanged.

Figure 4A:
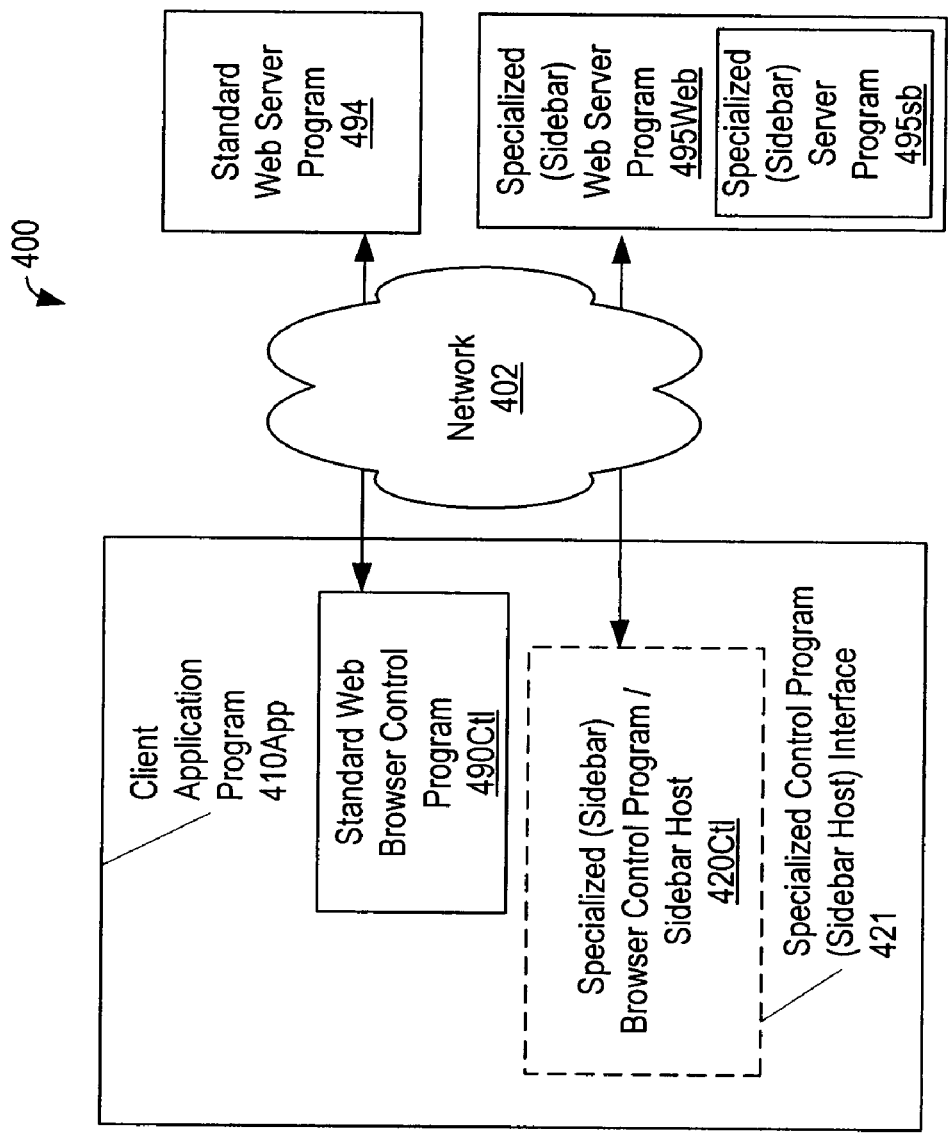
FIG. 4A is an example of an architecture for a software system in which the present invention can be used to implement features of the user interface shown in FIGS. 1 through 3J.

FIG. 4A is an example of an architecture for a software system for components implementing the user interface of FIGS. 1 through 3J in accordance with one embodiment of the invention. Client application program 410App represents a client application program running on a client computer system (not shown) of a client/server system. Client application 410App communicates via network 402 with standard web server program 494 and specialized (sidebar) web server program 495Web, which includes specialized (sidebar) server program 495*sb* that provides functionality specific to displaying a sidebar or other window not in a sidebar format. Each server program 494 and 495Web represents server software on a server computer system (not shown) for the client/server system 400.

Client application 410App includes two control programs, a specialized (sidebar) web browser control program/sidebar host 420Ctl (also referred to as specialized web browser control program 420Ctl) and a standard web browser control program 490Ctl. Each of specialized (sidebar) web browser control program 420Ctl and standard web browser control program 490Ctl provides standard web browser control functionality of rendering web pages from HTML documents.

Specialized web browser control program 420Ctl is configured to communicate with a server program, such as specialized (sidebar) web server program 495Web, which provides both web server functionality and specialized functionality for providing instructions to render web pages in a specialized format, shown here in a sidebar format.

In the embodiment shown in FIG. 4A, each of standard web browser control program 490Ctl and specialized web browser control program 420Ctl can be considered to operate independently of the other. Each of control programs 490Ctl and 420Ctl independently communicates with its respective web server program, respectively standard web server 494 and specialized (sidebar) web server 495Web, and neither of control programs 490Ctl and 420Ctl is nested within the other. As a result, data presented by one of control programs 490Ctl and 420Ctl is not necessarily available to the other. Further information about communication of information between control programs 490Ctl and 420Ctl is provided with reference to FIGS. 10A, 10B, and 11 below in the discussion pertaining to an event notification feature.

Client application 410App can be a specialized web browser application, such as Yahoo! Browser provided by YAHOO! Inc. of Sunnyvale, Calif. Alternatively, client application 410App can be another application using web technology to present information that has also been adapted to use the technology described herein. An example of an adaptation for an application to use the framework described herein is that the application should include a control program or other program configured to receive instructions for displaying information provided by a server (via a script in an HTML document or another mechanism for providing the instructions in a format that can be executed by a web browser control program).

Figure 4B:
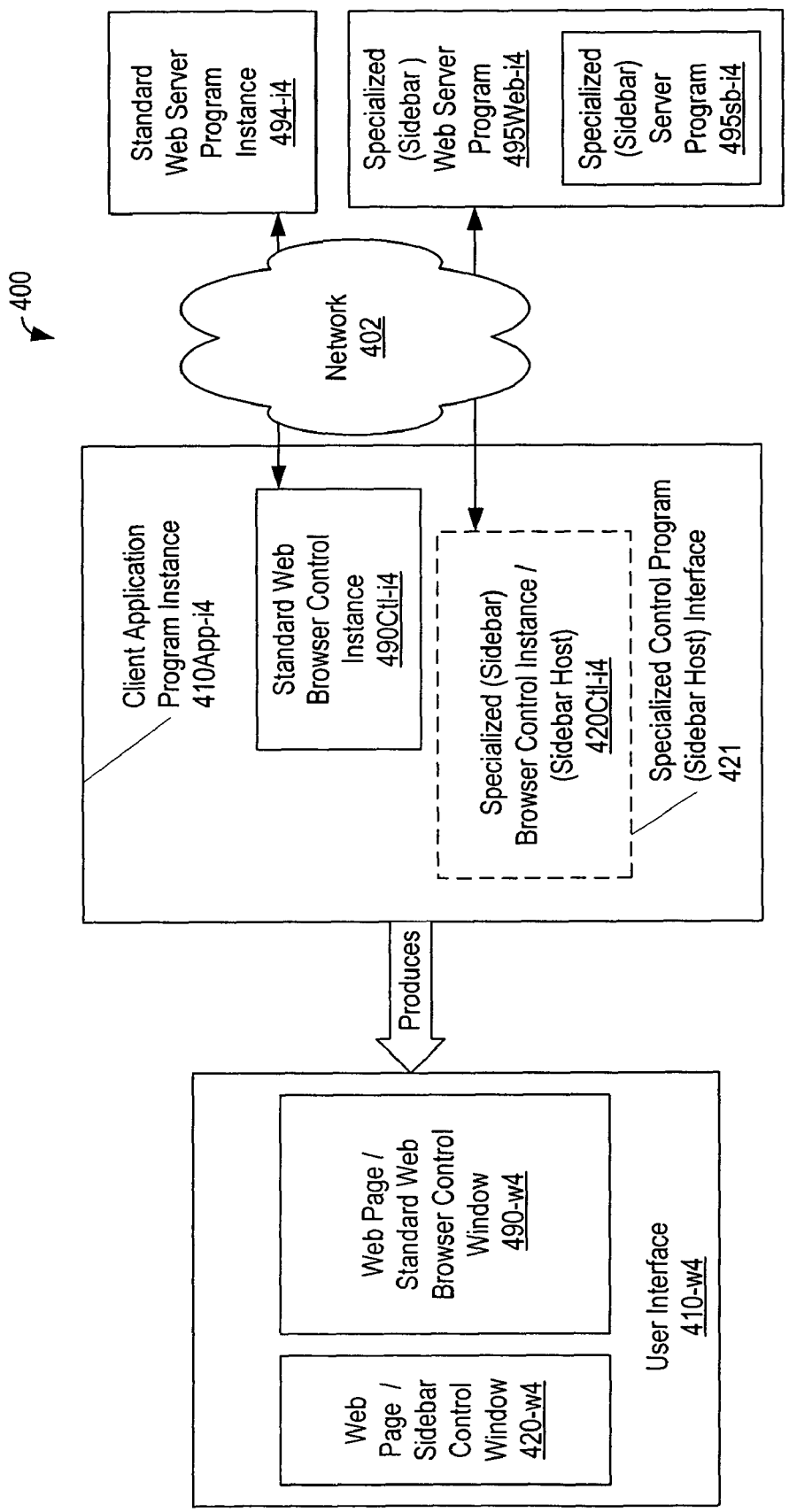
FIG. 4B shows interaction between the components of FIG. 4A in presenting a user interface such as the user interface shown in FIGS. 1 through 3J.

FIG. 4B shows a data flow through instances of components in the example architecture shown in FIG. 4A. Using instructions provided by specialized (sidebar) web server program instance 495Web-*i*4, client application program instance 410App-*i*4 produces a user interface 410-*w*4, which, in this example, includes a web page/sidebar control window 420-*w*4 rendered from an HTML document provided by specialized (sidebar) server program instance 495*sb*-*i*4. User interface 410-*w*4 also includes a web page/sidebar control window 490-*w*4, which is a standard web page. An example of one embodiment of user interface 410-*w*4 is provided in FIG. 1 as user interface 110, where sidebar 120 corresponds to web page/sidebar control window 420-*w*4 and web page 190 corresponds to the web page/standard web browser control window 490-*w*4.

One of skill in the art will recognize that the particular form of user interface 410-*w*4 is but one example of the types of user interfaces that can be provided using the methods, framework, and systems described herein. It is not necessary, for example, that a separate web page, such as web page 190 alongside sidebar 120 of FIG. 1, be provided and that the user interface include a sidebar configured to display modules and/or data in a particular format, such as sidebar 120. It is within the scope of the invention that modules displayed within a sidebar control window such as web page/sidebar control window 420-*w*4 instead can be arranged in a different format. While the examples described herein often include discussions of configuring or displaying a sidebar, one of skill in the art will understand that these discussions are included as examples only and that the content of the user interface and sidebar may be provided in other formats.

Figure 5:
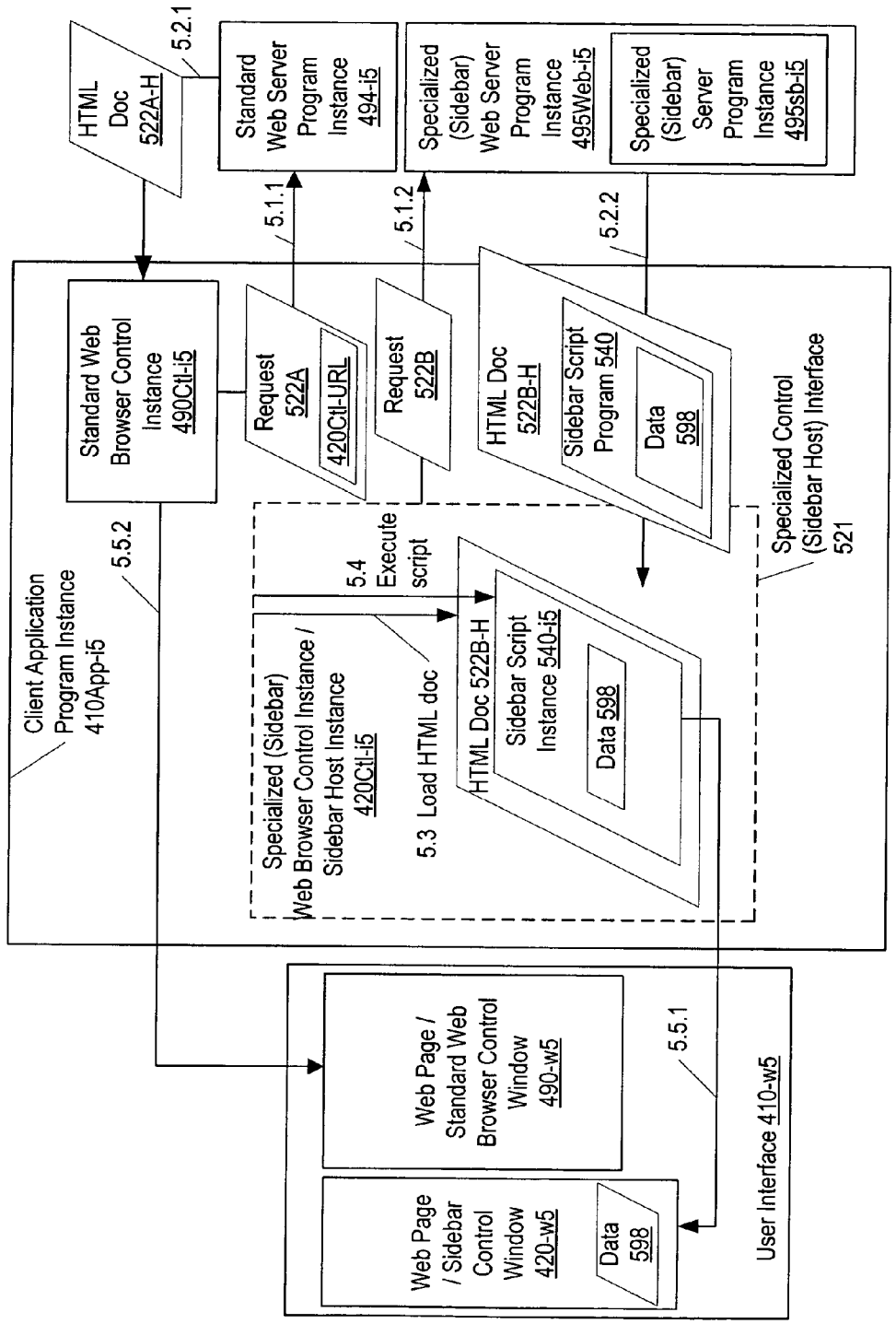
FIG. 5 is an example of a data flow through the software system of FIG. 4A.

FIG. 5 is an example of a data flow through the software system of FIG. 4. Action numbers are included in FIG. 5, as well as in subsequent figures, to guide the reader through the data flow. The order in which some of the actions are performed is not relevant; for example, actions 5.1.1 and 5.1.2 can be considered to occur simultaneously or in either order. In action 5.1.1, standard web browser control instance 490Ctl-*i*5 sends a request 522A for an HTML document to render to standard web server 494 instance 495-*i*-5. For example, when client application instance 410App-*i*5 is started, a user's pre-specified home page can be loaded into the main browser window, as represented by web page/standard browser control window 490-*w*5. In action 5.1.2, specialized (sidebar) browser control instance/sidebar host instance 420Ctl-*i*5 sends request 522B to specialized (sidebar) web server program instance 495Web-*i*5. When client application instance 410App-*i*5 is started, a URL for a top-level sidebar page, represented as 420Ctl-URL in FIG. 4, can be included in request 522B to obtain an HTML document to configure and display web page/sidebar control window 420-*w*5.

In action 5.2.1, standard web server instance 494-*i*5 provides web page HTML document 522A-H in response to request 522A to standard web browser control instance 490Ctl-*i*5. In action 5.2.2, specialized (sidebar) web server program instance 495Web-*i*5 provides HTML document 522B-H in response to request 522B to specialized (sidebar) web browser control instance 420Ctl-*i*5. HTML document 522B-H includes sidebar script 540, which includes encoded data 598. Sidebar script 540 is a program encoded in an interpreted language, such as JavaScript, which executes when HTML document 522B-H containing sidebar script 540 is loaded by a web browser control program instance, such as specialized web browser control instance 420Ctl-*i*5.

Encoded data 598 can include, for example, sidebar configuration data stored on the server computer system (not shown) hosting specialized (sidebar) web server 495Web-*i*5 regarding the number of modules to include in the sidebar discussed with reference to FIG. 2 or user preferences configuration data discussed with reference to FIGS. 3C and 3D. Data 598 may also include data obtained by specialized (sidebar) server program instance 495*sb*-*i*5 from another server program instance (not shown); for example, specialized (sidebar) server instance 495*sb*-*i*5 may retrieve other data from another server to initially configure presentation of a module indicated by the configuration information, such as calendar module 130C of FIG. 1. In action 5.3, specialized web browser control instance 420Ctl-*i*5 loads HTML document 522B-H, and in action 5.4, sidebar script instance 540-*i*5 executes. As a result of execution of the script, in action 5.5.1, web page/sidebar control window 420-*w*5 is presented. Data 598 can be used to configure web page/sidebar control window 420-*i*5 and/or can be presented within sidebar control window 420-*w*5, as shown. In action 5.5.2, web page 490-*w*5 is presented by standard web browser control instance 490Ctl-*i*5.

Figure 6:
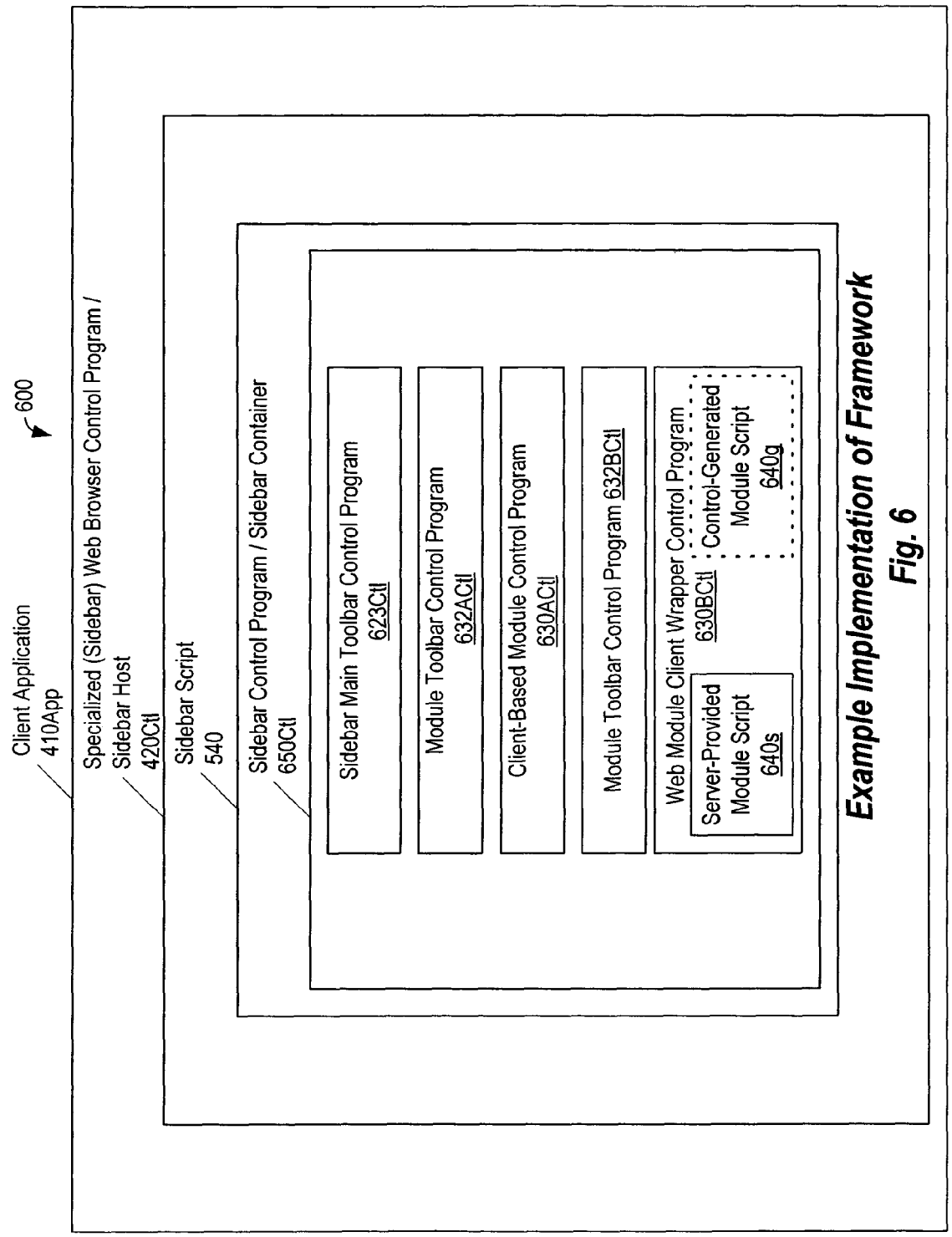
FIG. 6 shows an example of an architecture of a software system to present the sidebar portion of the user interface of FIGS. 1 through 3J.

FIG. 6 shows an example of a detailed software architecture for components to present a user interface, such as the user interface 110 of FIG. 1, including a specialized window, such as sidebar 120, or other specialized window in which a user can interact with multiple modules. This example architecture describes one implementation of a framework 600. Other implementations of sidebar software framework 600 may include additional components and control programs or fewer components and control programs than those shown in FIG. 6. As described above, client application 410App provides a user interface, such as user interface 110 of FIG. 1. Specialized (sidebar) web browser control program 420Ctl operates in conjunction with a specialized server program (such as specialized (sidebar) server program 495*sb* of FIG. 4, not shown here). The specialized server program can provide both information to display and instructions, such as sidebar script 540 and data embedded therein, to a specialized control program, such as specialized (sidebar) web browser control program 420Ctl, for displaying the information.

Specialized (sidebar) web browser control program/sidebar host 420Ctl does not provide a visible portion of the user interface, but instead serves as a host for other components that display a specialized window, such as sidebar 120 of FIG. 1. Sidebar script 540 is a script program, which also does not provide a visible portion of the user interface, but instead configures the display provided by another control program, such as sidebar control program/sidebar container 650Ctl. A specialized script, such as sidebar script 540, is provided by a specialized server program (such as specialized (sidebar) server program 495*sb* of FIG. 4 and the respective instance 495*sb*-*i*5 of FIG. 5) as part of an HTML document, such as HTML document 522B-H of FIG. 5. The instructions included in sidebar script 540 instruct sidebar control program/sidebar container 650Ctl to present modules, toolbars, and other user interface objects within a sidebar (or other specialized window). Sidebar control program/sidebar container 650Ctl passes appropriate instructions to the control programs for which it serves as a container.

The web page produced by specialized (sidebar) web browser control program/sidebar host 420Ctl provides modules (within panes of a specialized window, such as a sidebar) and toolbars within the specialized window. Five control programs are illustrated within sidebar control/sidebar container 650Ctl, including client-based module control program 630ACtl for presenting client-based modules such as calendar sidebar module 130C of FIG. 1. Sidebar control program/sidebar container 650Ctl also includes another module control, web module client wrapper control program 630BCtl, for presenting web-based modules such as mail module 130A weather module 130B of FIG. 1.

A client-based module control program, such as client-based module control program 630ACtl, is hosted directly by a client computer system running client application 410App. Although data to display by client-based module control program 630A can be obtained from a web server such as standard web server 494 of FIG. 4, the content presented within the client-based module window is laid out directly by client-based module control program 630ACtl without instructions from specialized (sidebar) web server program 495Web. However, the presentation of the module itself within a specialized window presented by sidebar container 650Ctl is configured by sidebar script 540. For example, referring back to FIG. 3A, client-based modules, such as calendar module 130C, which are presented by client-based module control 630ACtl, and web-based modules, such as mail module 130A and weather module 130B, are no different in appearance. All modules have the same look and feel to a user; for example, all modules have similarly-configured module titlebars 331A, 331B, and 331C; module toolbars 132A, 132B, and 132C; and thin scroll bars 373A, 373B, and 373C.

Referring again to FIG. 6, web module client wrapper control program 630BCtl represents a control program having a web host. To present a module, web module client wrapper control program 630BCtl receives input in the form of an HTML document provided by the specialized (sidebar) web server program 495Web. Within the HTML document provided is a server-provided module script 640s from a specialized (sidebar) web server program, such as specialized (sidebar) web server program 495Web of FIG. 4. Web module client wrapper control program 630Ctl translates function calls from other control programs, such as sidebar control program/sidebar container 650Ctl, into control-generated script instructions, represented by control-generated module script 640g. The dotted line around control-generated module script 640g indicates that the instructions within do not exist prior to loading another script, such as server-provided module script 640s, by an instance of web module client wrapper control program 630Ctl. The generated script instructions invoke other instructions provided within server-provided module script 640s to present the module.

The control-generated script instructions provided by control-generated module script 640g enable server-provided module script 640s to receive instructions from other control instances for displaying the web-based module within the sidebar; for example, the control-generated script instructions can specify the pane in which the web-based module, such as mail module 130A, is to be presented. The control-generated script instructions provided by web module client wrapper control program 630BCtl also enable features, such as the thin scroll bar feature described above with reference to FIG. 3J, to be provided for the modules presented by web module client wrapper control program 630BCtl. Other features can be added to the user interface, without the need for the hosting application to be changed.

In one embodiment, web module client wrapper control program 630BCtl generates script instructions (not shown in FIG. 6, but represented as an instance of control-generated module script 640g in subsequent figures of this document). The instance of control-generated module script 640g serves as a communication proxy for an executing instance of server-provided module script 640s. Additional control-generated script instructions within control-generated module script 640g shut down the instance of the object and set parameters for the instance of the object. In one embodiment, web module client wrapper control program 630BCtl can implement a method to add a menu item via the menu presentation control described with reference to FIGS. 2, 3C, and 3D. Web module client wrapper control program 630BCtl can also implement interfaces to interact with the text presentation control described with reference to FIGS. 3E through 3G, and to receive and send messages to other control programs in the framework described in FIG. 6.

Sidebar control program/sidebar container 650Ctl can also contain toolbar control programs, such as sidebar main toolbar control program 623Ctl, which presents a toolbar such as sidebar main toolbar 223 of FIG. 3A. Another type of toolbar control contained within sidebar control program/sidebar container 650Ctl is a module toolbar control, such as module toolbar controls 632ACtl and 632BCtl, for presenting a toolbar associated with a module, such as toolbar 132A for module 130A and toolbar 132B for module 130B in FIG. 1. Sidebar control program/sidebar container 650Ctl provides inter-module communication, configures the layout for displaying modules, responds to menu choices within modules, and manages sizing between panes for different modules. Functionality for performing these functions is provided by the server in sidebar script 540. In one embodiment, to support coordination between modules, each control included within sidebar control program/sidebar container 650Ctl implements a standard interface for communicating with other modules via sidebar control program/sidebar container 650Ctl. Interfaces between the components shown in FIG. 6 are discussed further with reference to FIG. 9 below.

Other features can be provided within a module. For example, module titlebars 331A, 331B, and 331C are presented by a specialized module titlebar control program (not represented in FIG. 6) that is contained within sidebar container 650Ctl and populated by sidebar script 540). Thin scroll bars 373A, 373B, and 373C are implemented by client-based modules such as client-based module control program 630ACH and web module client wrapper control program 630BCH.

Figure 7:
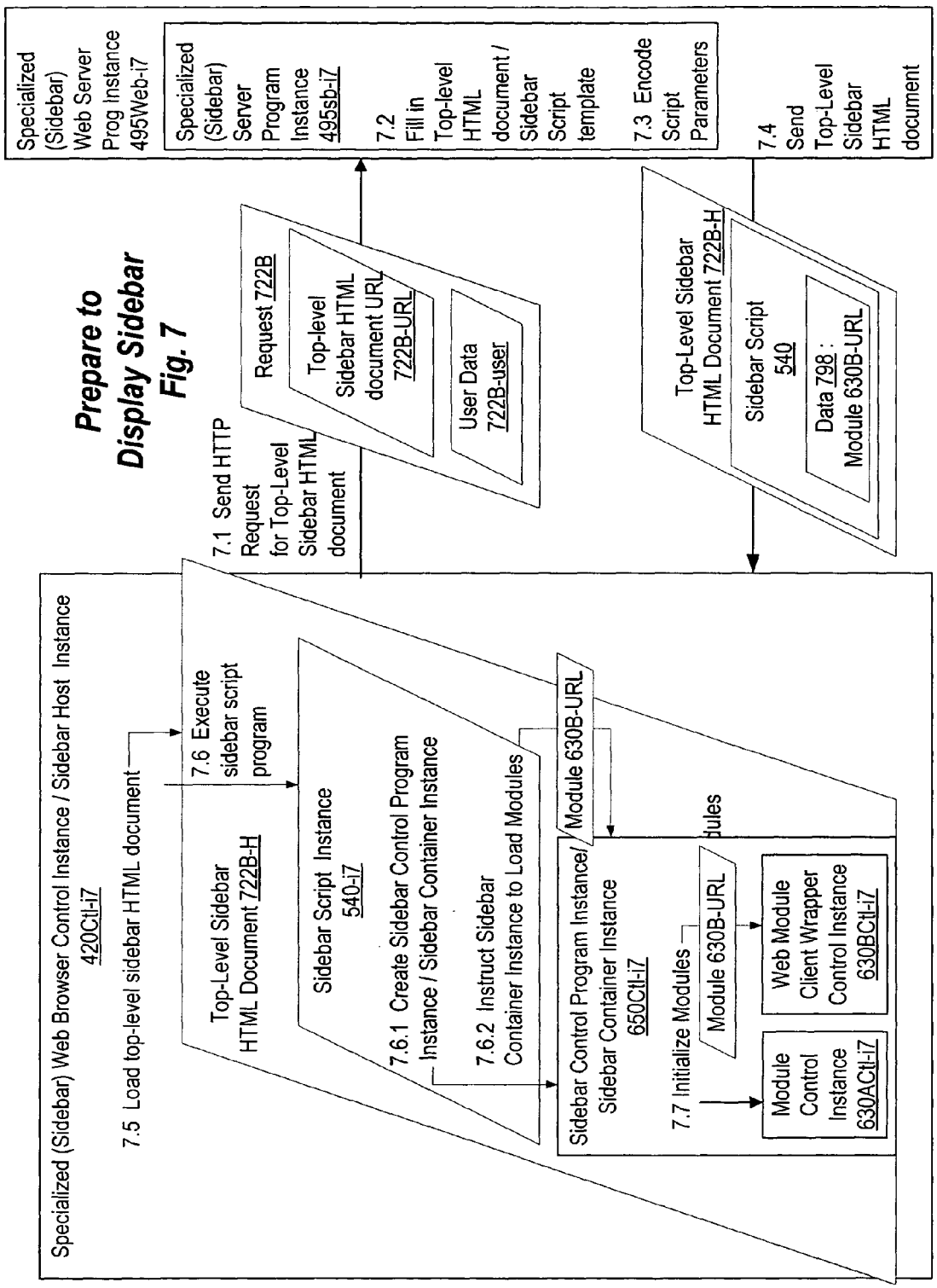
FIG. 7 shows an example of messages exchanged between the client and server of the architecture shown in FIGS. 4A and 6.

FIG. 7 shows an example of messages exchanged between client and server components to prepare to display a user interface (including a specialized window such as a sidebar) in accordance with one embodiment of the present invention. In this example, messages are exchanged between specialized (sidebar) web browser control instance/sidebar host control instance 420Ctl-$i7$, sidebar control program instance/sidebar container control instance 650Ctl-$i7$, and specialized (sidebar) web server instance 495Web-$i7$ to display an instance of a specialized window (not shown in FIG. 7), such as sidebar 120 of FIG. 1. In action 7.1, specialized (sidebar) web browser control instance/sidebar host instance 420Ctl-$i7$ sends an HTTP request 722B to specialized (sidebar) web server program instance 495Web-$i7$, providing a Uniform Resource Locator (URL) 722B-URL for a top-level sidebar HTML document that provides instructions (sidebar script 540) for generating and displaying an instance of a specialized window, such as a sidebar. The HTTP request, such as HTTP request 722B, can include other information, such as identifying information for the user of the application sending the HTTP request, shown as user data 722B-user.

In one embodiment, the URL for the top-level sidebar HTML document, such as 722B-URL, is provided by the client application, but URLs for other HTML documents used to display the sidebar are provided first from the server to the client application before the client application needs to request those HTML documents. This feature enables functionality of client application 410App to be provided by specialized (sidebar) web server program 495Web such that client application 410App, and particularly specialized web browser control program/sidebar host 420Ctl and sidebar container 650Ctl, do not need to change when functionality is modified or added.

In action 7.2, specialized (sidebar) web server program instance 495 Web-*i7* fills in a top-level HTML document/ sidebar script template obtained at LIRL 722B-URL to provide instructions to generate a web page/sidebar control window, such as sidebar control window 420-*w4* of FIG. 4A. In filling in various parameters in the HTML document/sidebar script template, specialized (sidebar) server program nstaiice 495*sb-i7* uses the user-identitfying infonnation from user data 722B-user of HTTP request 722B to identify user preferences and configuration data. For example, a particular user may have configured the sidebar to include two modules, a mail module and a calendar module, and he or she may have indicated a preference to present the calendar in a monthly format. This user preferences data and/or configuration information is stored on the server. Example implementations of server-provided preferences data and configuration data are further described in U.S. patent application Ser. No. 10/652, 607, filed herewith, entitled "Method And Apparatus For Providing Desktop Application Functionality In A Client/ Server Architecture," and naming Derrick Wang Whittle, Vincent Louis Sollicito and Edward F. Seitz as the inventors; and U.S. patent application Ser. No. 10/651,923, filed herewith, entitled "Method And System For Maintaining Synchronization Between A Local Data Cache Arid A Data Store," and naming Vincent Louis Sollicito and Edward F. Seitz as the inventors.

In action 7.3, specialized (sidebar) server program instance 495*sb-i7* encodes script parameters to include data to be presented as part of the web page and/or initial values for the script parameters. In action 7.4, specialized (sidebar) web server program instance 495Web-*i7* provides top-level sidebar HTML document 722B-H to specialized (sidebar) web browser control program/sidebar host instance 420Ctl-*i7*. In this example, top-level sidebar HTML document 722B-H includes sidebar script 540, which provides instructions for generating an instance of the sidebar. Top-level sidebar HTML document 722B-H also includes data 798, and the example data shown includes 630B-URL, which is a URL for an HTML document to use for displaying a module such as module 130A of FIG. 1 within the sidebar.

In action 7.5, specialized (sidebar) web browser control instance/sidebar host instance 420Ctl-*i7* loads top-level sidebar HTML document 722B-H and, in action 7.6, sidebar script program 540 is executed. As sidebar script instance 540-*i7* executes, in action 7.6.1, a sidebar control program/ sidebar container instance 650Ctl-*i7* is created. In action 7.6.2, sidebar script instance 540-*i7* instructs sidebar control program instance/sidebar container instance 650Ctl-*i7* to load modules making up the specialized window (sidebar) as configured by the user (or with a default configuration if the user has not yet configured the specialized window (sidebar)). For web-based modules, a URL, such as module 630B-URL, is provided for an HTML document that includes a script with instructions to provide contents of the module within the sidebar instance. In action 7.7, sidebar control program instance/sidebar container instance 650Ctl-*i7* constructs and initializes module control instance 630ACtl-*i7* and web module client wrapper control instance 630BCtl-*i7*, providing a URL 630B-URL for a module-specific HTML document to web module client wrapper control instance 630BCtl-*i7*.

Figure 8:
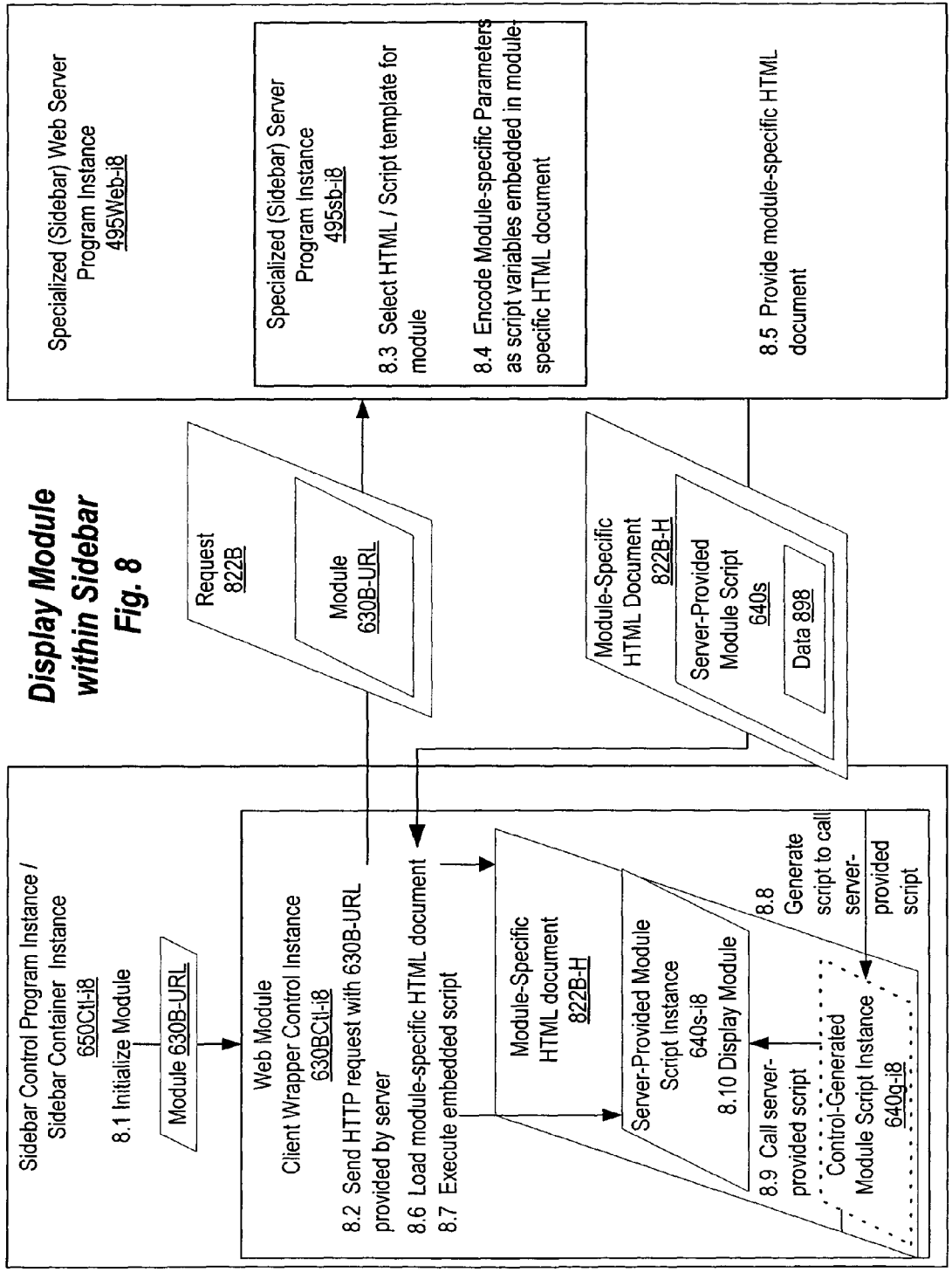
FIG. 8 shows an example of messages exchanged between the client and server of the architectures shown in FIGS. 4A and 6 to display modules within a sidebar of a user interface.

FIG. 8 shows an example of messages exchanged between sidebar container instance 650Ctl-*i8*, web module client wrapper control instance 630BCtl-*i8*, and specialized (sidebar) web server program instance 495Web-*i8* to provide an interface for web-based module 630BCtl-*i8* within a sidebar of a user interface. In action 8.1, sidebar container instance 650Ctl-*i8* initializes web module client wrapper control instance 630BCtl-*i8*, providing a URL 630B-URL for a module-specific HTML document including instructions to display a module window within the sidebar. Note that URL 630B-URL was originally provided by specialized (sidebar) server program instance 495Web-*i8*, as described with reference to FIG. 7, rather than by the client. In action 8.2, web module client wrapper instance 630BCtl-*i8* sends an HTTP request 822B for a web page at the module-specific URL 630B-URL. By providing a URL for an HTML document that includes instructions for displaying a specific module and associated data, the specialized (sidebar) web server program 495Web controls the display of the module within the sidebar and the contents of that specific module if that specific module is web-based. As a result, the server can be re-configured to provide new modules and/or new functionality within existing modules without the need to update the client application.

In action 8.3, specialized (sidebar) server program instance 495*sb-i8* selects an HTML/script template that corresponds to the URL provided by web module client wrapper control instance 630BCtl-*i8*. In one embodiment, each module can have one or more scripts that can provide instructions, depending upon configuration data and user preferences, and the specialized (sidebar) server program instance 495*sb-i8* includes logic to select the appropriate template.

In action 8.4, specialized (sidebar) server program instance 495*sb-i8* encodes module-specific parameters as script variables embedded in a module-specific HTML document 822B-H. In action 8.5, specialized (sidebar) web server program instance 495Web-*i8* provides module-specific HTML document 822B-H to web module client wrapper instance 630BCtl-*i8*. Module-specific web HTML document 822B-H includes server-provided module script 640*s* and data 898. In action 8.6, web module client wrapper 630BCtl-*i8* loads module-specific HTML document 822B-H and, in action 8.7, executes server-provided module script 640*s*, creating server-provided module script instance 640-*i8*.

In action 8.8, while executing server-provided module script instance 640-*i8*, web module client wrapper instance 630BCtl-*i8* generates script instructions, represented by control-generated module script instance 640*g-i8*. In action 8.9, web module client wrapper instance 630BCtl-*i8* executes the control-generated module script instance 640*g-i8* to call a function within server-provided module script instance 640*s-i8* when the user interacts with the module. In action 8.10, the function called within server-provided script instance 640*s-i8* displays the module. For example, control-generated module script instance 640*g-i8* and server-provided module script instance module script 640*s-i8* provide instructions regarding the size and location within the sidebar of the pane in which the module is to be presented, titlebars and toolbars to be presented, a default layout for data within the module, data to be presented by the module, and behavior to be performed in response to user actions.

Figure 9:
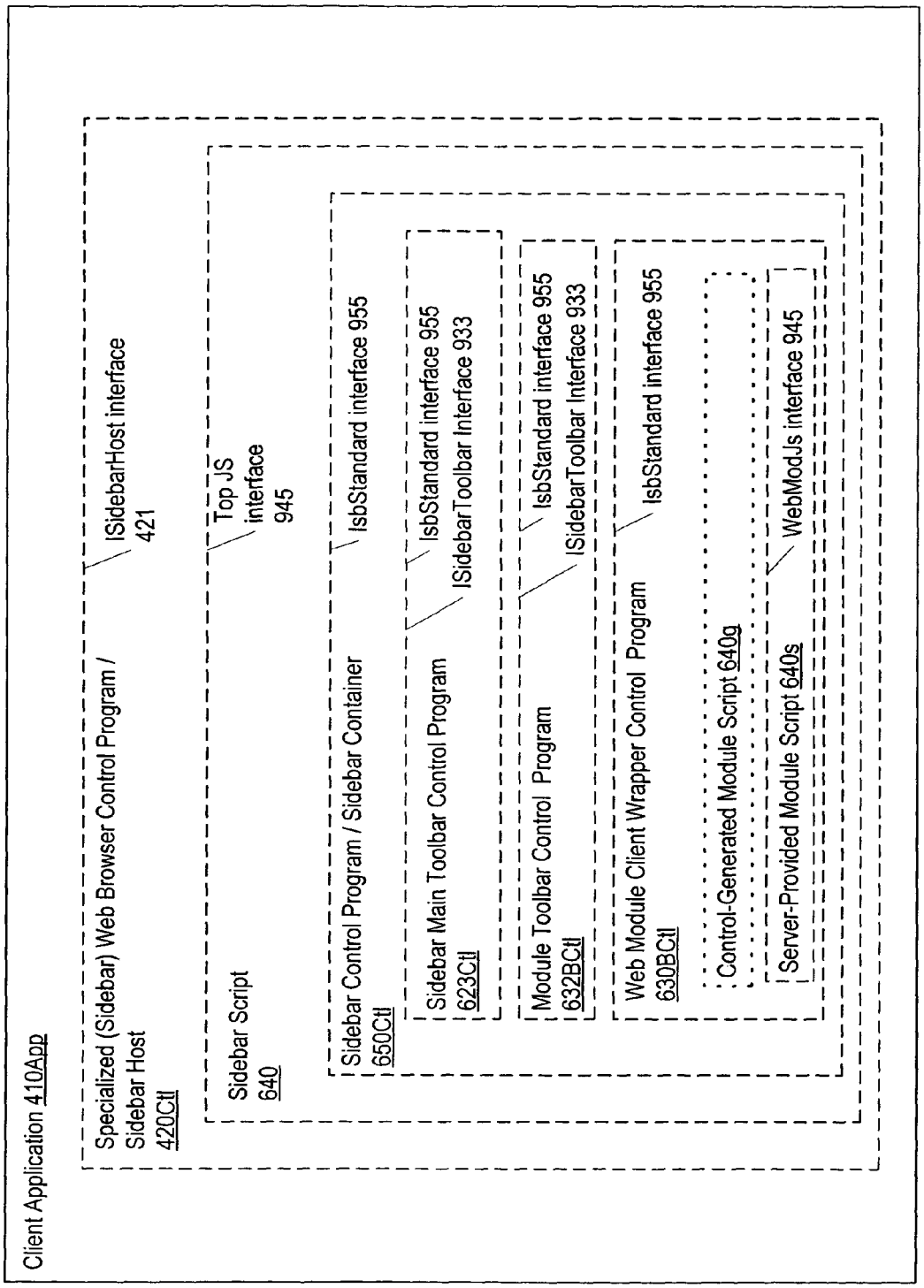
FIG. 9 shows examples of interfaces used in the software architectures of FIGS. 4A and 6.

FIG. 9 shows examples of interfaces that can be used in the software architectures of FIGS. 4A and 6. Client application 410App serves as a container for specialized (sidebar) web browser control program/sidebar host 420Ctl, as described above. A subset of the control programs and scripts described with reference to FIG. 6 is shown; for example, client-based module control program 630A and its respective module toolbar control program 632ACtl are not shown. The actions described with reference to web module client wrapper control program 630BCtl and its respective module toolbar control program 632BCtl are a superset of the actions performed by client-based module control program 630A and its respective module toolbar control program 632ACtl. Each of the controls and scripts in FIG. 9 is shown along with the name of an interface for communicating with that respective control or script. Examples of methods and properties for each interface shown are described below.

ISidebarHost interface 421, as previously shown in FIG. 4A, provides an interface for communicating with instances of specialized (sidebar) web browser control program/sidebar host 420Ctl. ISidebarHost interface 421 is implemented by sidebar host 420Ctl and can include, for example, an ApplicationName property having the name of the application, such as client application 410App, in which an instance of sidebar host 410Ctl is running. A MainBrowser property can provide an interface for another control, such as standard web control 490Ctl of FIG. 4A, that presents a web page within the main browser window (such as web page standard web browser control window 490-w4 presented in FIG. 4B). A HostWindow property can provide a handle (an identifier for an instance) of a window in which an instance of the sidebar is displayed, such as sidebar control window 420-w4 of FIG. 4B.

Examples of methods that can be provided by ISidebarHost interface 421 include the following:

Nav—Navigate the application's main browser window, such as main browser window 125 of FIG. 1, to a specified URL. This method can be called by one of the components presenting the sidebar to cause a web page to be displayed in response to an event. For example, in response to a click of an Inbox button within a mail module of the sidebar, the contents of the user's Inbox can be displayed in the display window adjacent to the sidebar control window, such as main browser window 125 of FIG. 3I.

NavNew—Open a new browser window and navigate the new browser window to a specified URL. This method can be called by one of the components presenting the sidebar to cause a new window to be opened to display a web page in response to an event. For example, in response to a click on a Compose button within a mail module of the sidebar, a new window can be opened in which the user can type a mail message. In contrast to the Nav method, the NavNew method preserves the current contents of an adjacent display window (such as main browser window 125 of FIG. 3I). An example of a window presented by the NavNew method is provided above with reference to FIG. 3K.

IsConnected—Determine whether a network connection exists. This method can be used, for example, to suspend activities such as automatic updates of data from the network when the client computer system no longer is connected to the network.

ShowSlideDlg—Display a slide-out window. An example of a slideout window is provided by window 313 of FIG. 3H. Slideout window 313 is displayed in response to clicking on an item 309 within calendar module 309, but does not replace web page 190 in main browser window 125.

ShowDlg—Display a modal, dialog-like web browser window and navigate the window to a specified URL. An example of such a dialog box is provided by mail options configuration window 139AOptions_configuration with reference to FIG. 3C.

Referring back to FIG. 9, sidebar script 640 implements a TopJS interface 945. TopJS interface 945 can include a set of functions (in a script) that are executed when the top-level sidebar HTML document is loaded, as described with reference to FIGS. 7 and 8. Examples of methods that can be provided by TopJS interface 945 include the following:

onNotify—Send a notification message. This method can be used, for example, by the sidebar host instance to send a notification message to the sidebar container instance. In one embodiment, the sidebar host instance invokes a method provided by the IsbStandard interface 955 (described in further detail below) implemented by the sidebar container instance. In response to the invocation of the notification method, the sidebar container instance may pass the notification message to module control instances and other control instances running in the sidebar container instance. An example of a scenario in which the onNotify method is used is provided with reference to FIG. 11 described below.

scRequestParams—Request initialization parameters to initialize a module. This method can be invoked by the sidebar container instance to request initialization information for a given module control instance, such as web module client wrapper control instance 630BCtl-i7 of FIG. 7.

onHide—Hide the sidebar. This method can be invoked by the sidebar host instance when the user hides the sidebar.

onReopen—Reopen the sidebar. This method can be invoked by the sidebar host instance when the user reopens the hidden sidebar.

onRequestModules—Request certain modules to be displayed. This method can be used by the sidebar host instance to request certain modules to be displayed to support co-browsing.

onExternalMenu—Populates a menu outside the sidebar. This method can be used by the sidebar host instance to populate a menu outside the sidebar. In one embodiment, the onExternalMenu method is used to support the menu titlebar for the Explorer Bar interface of Microsoft Internet Explorer.

An IsbStandard interface 955 is implemented by sidebar control program/sidebar container 650Ctl, as well as by other controls nested within sidebar control program/sidebar container 650Ctl. These other controls include sidebar module controls, such as module control program 630ACtl and web module client wrapper control program 630BCtl; and sidebar toolbars, such as toolbar control 632BCtl.

Examples of methods that can be provided by IsbStandard interface 955 include the following:

sbStartUp/sbShutdown—Start/create or shut down the targeted component instance. These methods can be invoked by the sidebar script provided in the top-level sidebar HTML document, such as sidebar script 540 of top-level sidebar HTML Document 722B-H of FIG. 7. In one embodiment, each component instance invokes the sbStartUp and sbShutdown methods for each of its children component instances.

sbNotify—Pass a notification message to another component. This method can be used, for example, by an instance of sidebar control program/sidebar container 650Ctl to pass notification messages to modules running within the sidebar container instance. In one embodiment, each component instance passes notification messages to the children component instances for which the component instance serves as a host.

sbSetBrowser—Pass a handle (identifier) for an object implementing ISidebarHost interface 425. This method can be invoked by the sidebar script provided in the top-level sidebar HTML document. The SbSetBrowser method enables an instance of the sidebar control program/sidebar container 650Ctl to send messages to an instance of the specialized (sidebar) web browser control program/sidebar host 420Ctl via ISidebarHost interface 421.

sbSetParams—Pass initialization parameters to a component instance. This method can be used, for example, by a sidebar container instance to send initialization parameters to module control instances included within the sidebar container instance. These parameter values can be obtained by invoking the scRequestParams method of TopJS interface 945, using the handle provided in the SbSetBrowser method of the IsbStandard interface described above.

sbSetPosition—Inform a component of its position within the sidebar. This method can be used, for example, by a sidebar container instance to inform a module control instance of its relative position within the module control instances in the sidebar. For example, this method can instruct that a respective module control window be displayed in the third position of four positions available for modules within a sidebar.

Referring again to FIG. 9, module toolbar control program 632Ctl implements both IsbStandard interface 955 and ISidebarToolbar interface 933. ISidebarToolbar interface 933 can be used, for example, by the sidebar script provided within the top-level sidebar HTML document to populate the sidebar main toolbar, such as sidebar main toolbar 322 of FIG. 3. In addition, ISidebarToolbar interface 933 can be used by web module client wrapper control program 630BCtl to populate module toolbars, such as toolbars 132A, 132B, and 132C within respective modules 130A, 130B, and 130C of FIG. 3A. Populating a toolbar includes specifying which icons to provide within the toolbar and providing a program having the functionality to be provided by each toolbar icon. Methods can be provided within ISidebarToolbar interface 933 to specify a toolbar's buttons, background appearance, graphics, sizing behavior, tool tips, and so on. Because the sidebar script and the server-provided module scripts are obtained from the server, the display and functionality of each toolbar can be re-configured at the server without the need to update the client application.

WebModJS interface 935 is implemented by server-provided module script 640s of FIG. 6. Control-generated module script 640g translates the IsbStandard interface to the WebModJS interface. An instance of web module client wrapper control program 630BCtl can provide functionality by executing scripts embedded within the HTML document and generating additional script instructions, as described with reference to FIGS. 6 through 8. Thus, even though a server-provided module script, such as server-provided module script 640s, cannot implement a COM interface directly, the instance of web module client wrapper control program 630BCtl translates the standard IsbStandard COM interface into script function invocations of WebModJS interface 935 to serve as a proxy for the IsbStandard COM interface. Thus, an instance of web module client wrapper control program 630BCtl serves as a proxy for standard sidebar functions, such as the sidebar functions performed by methods StartUp, Shutdown, sbSetParams, and sbNotify in IsbStandard interface 955.

Figure 10A:
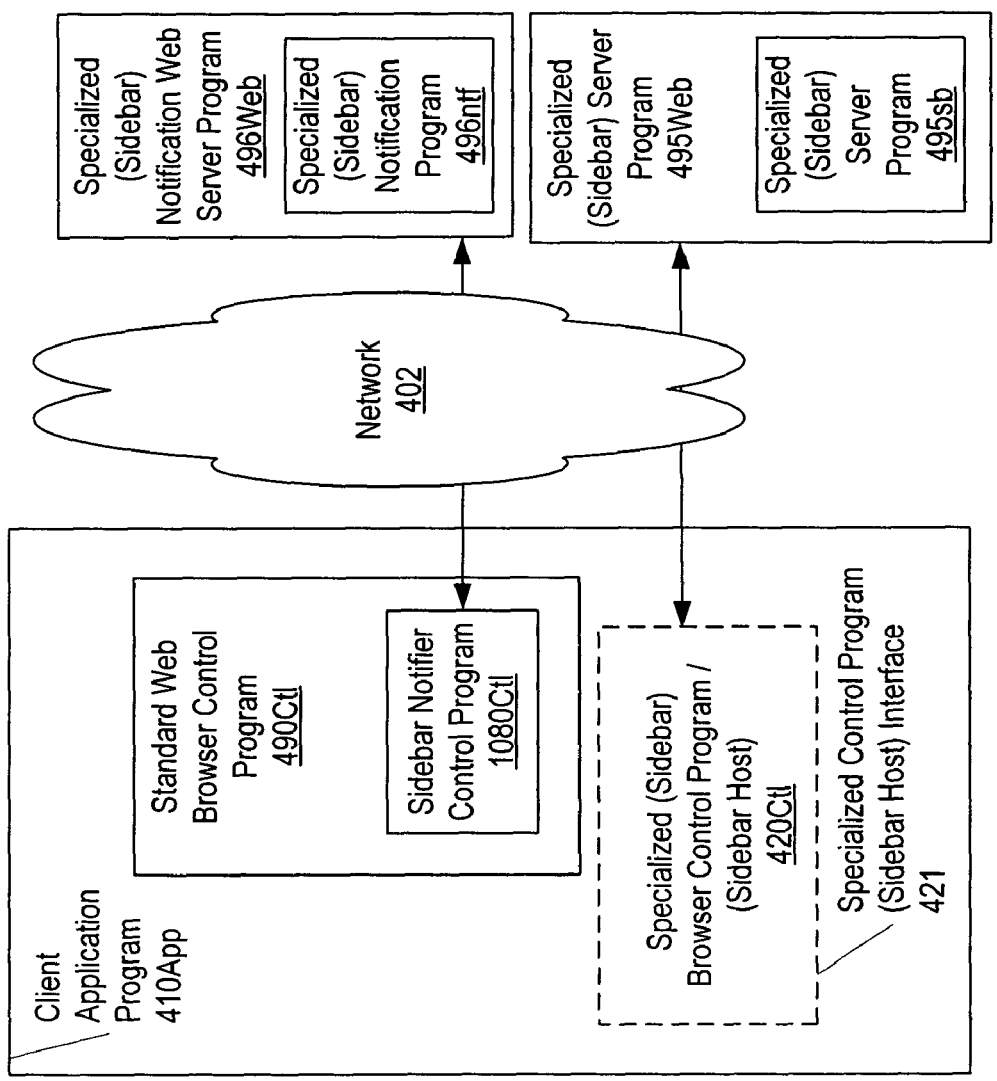
FIG. 10A shows an alternative architecture for a software system implementing the user interface of FIG. 1 and providing notification messages to ensure that data displayed in a sidebar and in an independent application window are consistent.

FIG. 10A shows an alternative architecture for a software system implementing the user interface of FIG. 1 and providing notification messages to ensure that data displayed in a sidebar and in an independent display window are consistent.

As in FIG. 4A, client application 410App of FIG. 10A includes specialized (sidebar) web browser control program/ sidebar host 420Ctl (also referred to as specialized web browser control program 420Ctl) and a standard web browser control program 490Ctl. Each of standard web browser control program 490Ctl and specialized web browser control program 420Ctl can be considered to operate independently of the other, although in this embodiment, standard web browser control 490Ctl includes a sidebar notifier control program 1080Ctl that is instructed by specialized web browser control program 420Ctl. Sidebar notifier control program 1080Ctl communicates with specialized (sidebar) notification web server program 496Web. An instance of sidebar notifier control program 1080Ctl need not exist at all times; a sidebar notifier control instance can be instantiated when there is a need to send a notification message due to receiving a notification from an instance of specialized (sidebar) notification web server program 496Web. Such a notification indicates that a change to data displayed in a web page has occurred. Specialized (sidebar) notification web server program 496Web includes specialized (sidebar) notification program 496ntf to perform processing similar to that of specialized (sidebar) server program 495sb.

Figure 10B:
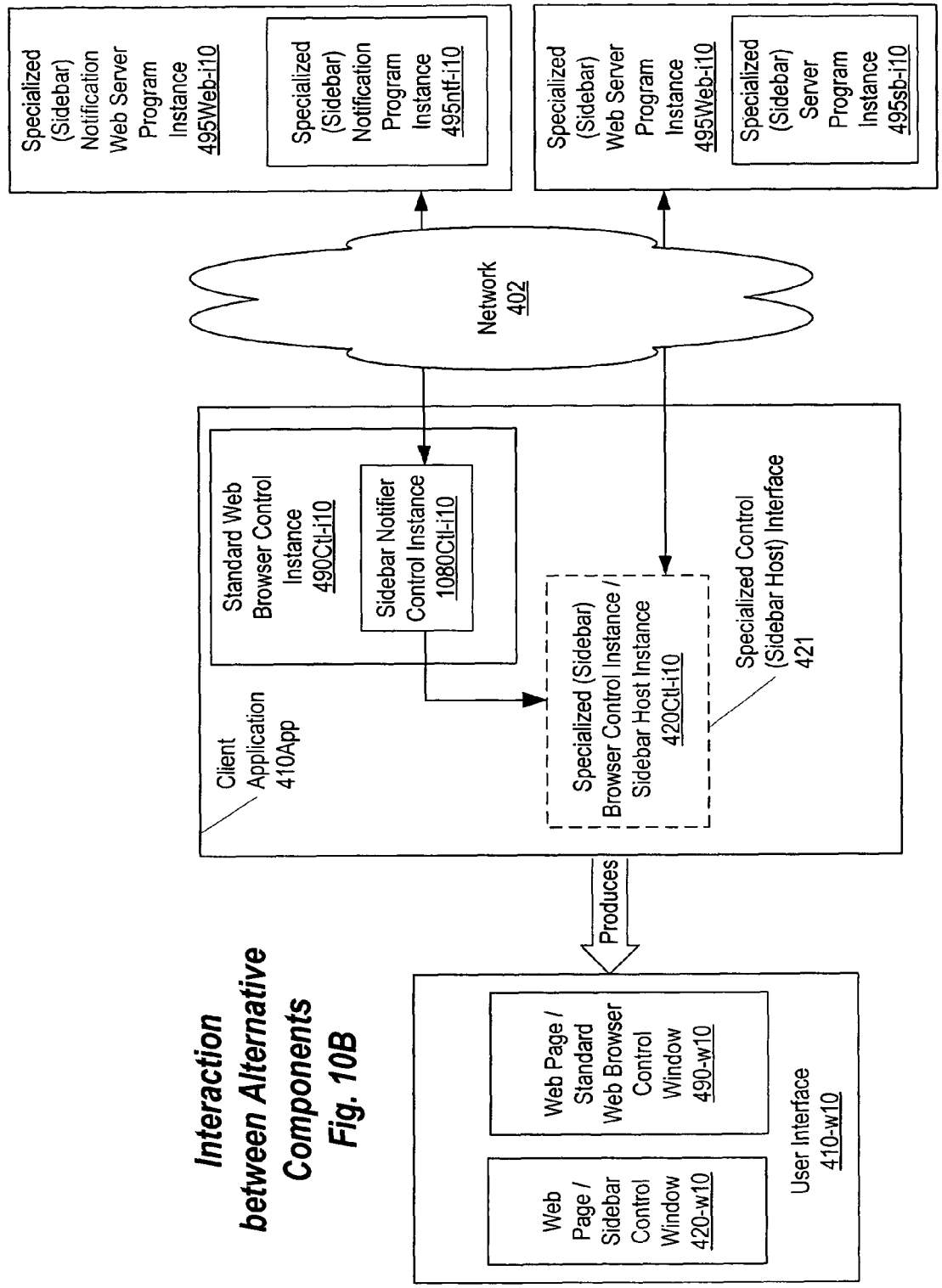
FIG. 10B shows a data flow through components in the alternative architecture of FIG. 10A.

FIG. 10B shows interaction between the components described with reference to FIG. 10A. The interaction between components is similar to that described with reference to FIGS. 4B through 8. When data displayed by standard web browser control instance 490Ctl-i10 are changed and an HTTP request with the changed data (not shown) is sent to specialized (sidebar) notification web server instance 495Web-i10, sidebar notifier control instance 1080Ctl-i10 notifies specialized (sidebar) web browser control instance/ sidebar host instance 420Ctl-i10 of the change to the data so that consistent data can be displayed within each web page. Web page/sidebar control window 420-w10 and web page/ standard web browser control window 490-w10 should display consistent data, although not necessarily in the same format. This communication to provide notification of sidebar module control instances is described in further detail with reference to FIG. 11.

FIG. 11 shows a data flow notifying sidebar control programs to update data displayed in the sidebar in response to a change to data within a web page, such as web page/standard web browser control window 410-w10 described with reference to FIG. 10B. The example of FIG. 11 assumes that HTML documents for the sidebar host instance 620Ctl-i11, sidebar container instance 650Ctl-i11, and web module client wrapper control instance 630Ctl-i11 have been loaded. The example of FIG. 11 also assumes that sidebar script 540 and sidebar server-provided module script 640s have been executed; and that at least a startup function of server-provided module script 640s has been invoked. In action 11.1, standard web browser control instance 490Ctl-i11 sends a request 1122 including changed data 1122-data, made within a web page that standard web browser control instance 490Ctl displays. The request is sent to specialized (sidebar) notification web server program instance 496Web-*i*11. In response to receiving the updated data, in action 11.2.1, specialized (sidebar) notification program instance 496*ntf*-*i*11 initializes a notification HTML/script template, similar to the initialization performed with reference to the HTML/script templates for sidebar script 540 in FIGS. 5 and 7 and server-provided module script 640*s* in FIG. 8. In action 11.2.2, specialized (sidebar) notification web server program instance 496Web-*i*11 provides an HTML document 1122-H containing a notification script 1142 and changed data 1122-data to standard web browser control instance 490Ctl-*i*11. In action 11.3, when standard-web browser control instance 490Ctl-*i*11 loads HTML document 1122-H, notification script 1142 executes, as shown in action 11.4. In action 11.4, notification script instance 1142-*i*11 is created, and in action 11.4.1, notification script instance 1142-*i*11 creates sidebar notifier control instance 1080Ctl-*i*11. In action 11.4.2, notification script instance 1142-*i*11 instructs sidebar notifier control instance 1080Ctl-*i*11 to notify the sidebar host instance 420Ctl-*i*11 that the change in changed data 1122-data has occurred.

In action 11.5, sidebar notifier control instance 1080Ctl-*i*11 sends a notification message 1144 to sidebar host instance 420Ctl-*i*11. In action 11.6, sidebar host instance 420Ctl-*i*11 calls a notification handler function program instance 1146-*i*11 of sidebar script instance 540-*i*11. In response, notification handler function program instance 1146-*i*11 sends a notification message to sidebar container instance 650Ctl-*i*11 in action 11.7. In action 11.8, sidebar container instance 650Ctl-*i*11 sends a notification message, such as notification message 1144, to each of its children component instances, including web module client wrapper control instance 630BCtl-*i*11, as shown. In action 11.9, generated script instructions, represented by control-generated module script instance 640*g*-*i*11, call a module notification handler script instance of module script instance 640-*i*11, which, in action 11.10, immediately displays the changed data 1122-data.

The functionality provided by specialized (sidebar) notification web server program 496Web and specialized (sidebar) notification program 496*ntf* can be implemented in several ways. For example, request 1122 could be sent to a standard web server, such as an instance of standard web server control program 494, providing a parameter with a URL for a notification web server, such as (sidebar) notification web server program 496Web. The standard web server control instance could return a response that causes the standard web browser control instance to send a second request to the URL provided, and the notification web server contacted could send the notification HTML document. Other possible scenarios are also within the scope of the invention.

As a result, a web browser control instance receiving an update to data via a web page notifies a second web browser control instance that is capable of displaying the data that the data have changed. In some embodiments, in response to the notifications, second web browser control instance's respective copy of the data is updated. This event notification functionality enables multiple independent web browser instances to display the same data simultaneously without each web browser instance requesting the HTML document from the server. The multiple web browser instances can operate independently of one another. For example, standard web browser control instance 490Ctl-*i*11 may operate independently of specialized sidebar web browser control instance/sidebar host instance 420Ctl-*i*11. For example, neither standard web browser control instance 490Ctl-*i*11 or specialized sidebar web browser control instance/sidebar host instance 420Ctl-*i*11 hosts the other web browser control instance. In addition, web browser control instances 490Ctl-*i*11 and 420Ctl-*i*11 may not be hosted by the same container instance. Web browser control instances 490Ctl-*i*11 and 420Ctl-*i*11 can be running within different application instances when a user has two or more applications running and each application instance includes a web browser control instance. For example, sidebar notifier control instance 1080Ctl-*i*11 can send notification messages, such as notification 1144, to both sidebar host instance 420Ctl-*i*11 running within the same application instance and to another sidebar host instance running in another application instance. Stated another way, all sidebar host instances currently running on the client computer system are notified, even when they are running within different application instances.

Other Embodiments

The functionality described with reference to the architecture shown in FIGS. 4A, 6, and 10A can be provided by many different software and hardware configurations. One of skill in the art will recognize that the functionality described for the ActiveX controls described herein may be performed by various types of controls, modules, instructions, and/or other means of providing the functionality.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components, such as the controls included within sidebar control program/sidebar container 650Ctl of FIG. 6. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communication links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    dynamically obtaining a text included in a web page;
    displaying a scroll bar having a dimension greater than zero in a first area that is thinner than a scroll bar displayed in a third area to increase available size of the first area, wherein the third area is associated with the first area;
    dynamically calculating from the text a maximum portion of the text that can be displayed within the first area, wherein dynamically calculating is a function of available size of the first area and the size of all of the text;
    displaying the maximum portion of the text that can be displayed within the first area when all of the text cannot be displayed within the first area; and
    displaying all of the text in a second area in response to a mouseover event occurring with reference to the maximum portion of the text displayed in the first area.

2. The method of claim 1 further comprising:
    performing an action related to the text in response to a second event occurring in the second area displaying all of the text.

3. The method of claim 2 wherein a portion of the second area extends outside the first area, and the second event occurs within the portion of the second area.

4. The method of claim 2 wherein the second event is a click event.

5. The method of claim 2 wherein the performing the action comprises displaying information related to the text in a fourth area adjacent to the first area.

6. The method of claim 5 further comprising:
    continuing to display the maximum portion of the text in the first area when the information related to the text is displayed in the fourth area.

7. The method of claim 2 wherein the second area overlays a fourth area, and the fourth area exists outside a window provided by a host application, wherein a text presentation control instance running within the host application performs:
    the displaying of the maximum portion of the text, and
    the displaying of all of the text.

8. The method of claim 1 wherein all of the text comprises a hyperlink to content described by the text.

9. The method of claim 1 wherein the first area comprises a sidebar.

10. The method of claim 1 further comprising:
    displaying a remaining portion of the text outside the first area when all of the text is displayed, wherein the maximum portion of the text does not comprise the remaining portion.

11. The method of claim 1 wherein the text are obtained from an HTML document prior to the displaying.

12. The method of claim 1 further comprising:
    obtaining the text from a document prior to the displaying, wherein a web browser performs the obtaining.

13. The method of claim 1 further comprising:
    adjusting the maximum portion of the text when the available size of the first area changes.

14. The method of claim 13 wherein adjusting the maximum portion of the text comprises adjusting a number of characters displayed in the maximum portion of the text to fit within the available size of the first area.

15. The method of claim 1 further comprising:
    when the maximum portion of the text comprises all of the text, performing an action related to the text in response to a click event occurring with reference to the maximum portion of the text.

16. The method of claim 15 wherein the performing the action comprises presenting information related to the text in a second area adjacent to the first area.

17. The method of claim 16 further comprising:
    continuing to display the first area and the maximum portion of the text when the information related to the text is displayed in the second area.

18. The method of claim 17 wherein continuing to display the first area and the maximum portion of the text when the complete description is displayed in a second area.

19. A method comprising:
    displaying a web page in a main browser window;
    dynamically obtaining a text included in the web page;
    displaying a scroll bar having a dimension greater than zero in a first area that is thinner than a scroll bar displayed in the main browser window to increase available size of the first area, wherein the first area excludes text within a scroll bar area for the thinner scroll bar, and the main browser window is associated with the first area;
    dynamically calculating from the text a maximum portion of the text that can be displayed within the first area, wherein dynamically calculating is a function of available size of the first area and the size of all of the text;
    displaying the maximum portion of the text that can be displayed within the first area outside the main browser window when all of the text cannot be displayed within the first area;
    displaying all of the text in a second area in response to a mouseover event occurring with reference to the maximum portion of the text; and continuing to display the web page in the main browser window after the mouseover event.

20. The method of claim 19 further comprising:
continuing to display the web page in the main browser window until a click event occurs in the second area.

21. The method of claim 20 wherein the click event causes a second web page to be displayed in the main browser window.

22. The method of claim 20 further comprising:
continuing to display the maximum portion of the text within the first area after the click event.

23. The method of claim 19 further comprising:
continuing to display all of the text until a second click event occurs outside the second area.

24. The method of claim 19 further comprising:
overlaying the first area with the second area when the maximum portion of the text comprises all of the text.

25. A computer-readable storage medium comprising:
text presentation instructions configured to:
dynamically obtain a text included in a web page;
display a scroll bar having a dimension greater than zero in a first area that is thinner than a scroll bar displayed in a third area to increase available size of the first area, wherein the first area excludes text within a scroll bar area for the thinner scroll bar, and the third area is associated with the first area;
dynamically calculate from the text a maximum portion of the text that can be displayed within the first area, wherein the dynamic calculation is a function of available size of the first area and the size of all of the text;
display the maximum portion of the text that can be displayed within the first area when all of the text cannot be displayed within the first area; and
display all of the text in a second area in response to a mouseover event occurring with reference to the maximum portion of the text displayed in the first area.

26. The computer-readable medium of claim 25 wherein the text presentation instructions are further configured to perform an action related to the text in response to a second event occurring in a second area displaying all of the text.

27. The computer-readable medium of claim 26 wherein the text presentation instructions are further configured to display information related to the text in a fourth area adjacent to the first area in response to the second event.

28. The computer-readable medium of claim 27 further comprising:
the text presentation instructions configured to continue to display the first area and the maximum portion of the text when the information related to the text is displayed in the third area.

29. The computer-readable medium of claim 25 wherein a portion of the second area extends outside the first area, and the second event occurs within the portion of the second area.

30. A computer-readable storage medium comprising:
instructions configured to use a text presentation control program, wherein the text presentation control program is configured to:
dynamically obtain a text included in a web page;
display a scroll bar having a dimension greater than zero in a first area that is thinner than a scroll bar displayed in a third area to increase available size of the first area, wherein the first area excludes text within a scroll bar area for the thinner scroll bar, and the third area is associated with the first area;
dynamically calculate from the text a maximum portion of the text that can be displayed within the first area, wherein the dynamic calculation is a function of available size of the first area and the size of all of the text;
display the maximum portion of the text that can be displayed within the first area when all of the text cannot be displayed within the first area; and
display all of the text in a second area in response to a mouseover event occurring with reference to the maximum portion of the text displayed in the first area.

31. The computer-readable medium of claim 30 wherein the text presentation control program is further configured to perform an action related to the text in response to a second event occurring in a second area displaying all of the text.

32. The computer-readable medium of claim 31 wherein the text presentation control program is further configured to display information related to the text in a fourth area adjacent to the first area in response to the second event.

33. The computer-readable medium of claim 32 further comprising:
the text presentation control program is further configured to
continue to display the first area and the maximum portion of the text in the first area when the information related to the text is displayed in the fourth area.

34. The computer-readable medium of claim 30 wherein the text presentation control program is further configured to display the complete portion in second area, wherein a portion of the second area extends outside the first area, and
the second event occurs within the portion of the second area.

35. A computer system comprising:
a processor to execute instructions, and
a memory to store the instructions, wherein the instructions comprise:
text presentation instructions configured to
dynamically obtain a text included in a web page;
display a scroll bar having a dimension greater than zero in a first area that is thinner than a scroll bar displayed in a third area to increase available size of the first area, wherein the first area excludes text within a scroll bar area for the thinner scroll bar, and the third area is associated with the first area;
dynamically calculate from the text a maximum portion of the text that can be displayed within the first area, wherein the dynamic calculation is a function of available size of the first area and the size of all of the text;
display the maximum portion of the text that can be displayed within the first area when all of the text cannot be displayed within the first area; and
display all of the text in a second area in response to a mouseover event occurring with reference to the maximum portion of the text displayed in the first area.

36. The computer system of claim 35 wherein the text presentation instructions are further configured to
perform an action related to the text in response to a second event occurring in a second area displaying all of the text.

37. The computer system of claim 36 wherein the text presentation instructions are further configured to display information related to the text in a fourth area adjacent to the area in response to the second event.

38. The computer system of claim 37 further comprising:
the text presentation instructions are further configured to continue to display the area and the maximum portion of the text in the area when the information related to the text is displayed in the fourth area.

39. The computer system of claim 35 wherein the text presentation instructions are further configured to display all of the text in a second area, wherein a portion of the second area extends outside the first area, and the second event occurs within the portion of the second area.

40. A hardware apparatus comprising:

means for dynamically obtaining a text included in a web page;

first displaying means for displaying a scroll bar having a dimension greater than zero in a first area that is thinner than a scroll bar displayed in a third area to increase available size of the first area, wherein the first area excludes text within a scroll bar area for the thinner scroll bar, and the third area is associated with the first area;

second displaying means for displaying from the text a maximum portion of the text that can be displayed within the first area when all of the text cannot be displayed within the first area, wherein the maximum portion of the text that can be displayed within the first area is dynamically calculated, and the dynamic calculation is a function of the available size of the first area and the size of all of the text; and third displaying means for displaying all of the text in a second area in response to a mouseover event occurring with reference to the maximum portion of the text in the first area.

41. The apparatus of claim 40 further comprising:

performing means for performing an action related to the text in response to a second event occurring in a second area displaying all of the text.

42. The apparatus of claim 41 further comprising:

fourth displaying means for displaying information related to the text in a fourth area adjacent to the area in response to the second event.

43. The apparatus of claim 42 further comprising:

continuing means for continuing to display the area and the maximum portion of the text in the area when the information related to the text is displayed in the fourth area.

44. The apparatus of claim 40 wherein the second displaying means comprise third displaying means for displaying all of the text in a second area, wherein a portion of the second area extends outside the first area, and the second event occurs within the portion of the second area.

\* \* \* \* \*